United States Patent [19]
Lanzdorf et al.

[11] Patent Number: 5,501,567
[45] Date of Patent: Mar. 26, 1996

[54] REFUSE VEHICLES

[75] Inventors: Daniel J. Lanzdorf, Pickett; Thomas H. Betters, Appleton; Eric E. Braun, Oshkosh; Chad O. Konop, Oshkosh; James L. Steiner, Oshkosh, all of Wis.

[73] Assignee: Oshkosh Truck Corporation, Oshkosh, Wis.

[21] Appl. No.: 29,115

[22] Filed: Mar. 10, 1993

Related U.S. Application Data

[63] Continuation-in-part of Ser. No. 879,761, May 6, 1992, abandoned.

[51] Int. Cl.$^6$ ............................................. B60P 1/28
[52] U.S. Cl. ................ 414/408; 414/409; 414/421; 414/486; 414/525.6; 414/509; 414/518; 280/704; 298/11
[58] Field of Search .................. 414/403, 405, 414/406, 407, 408, 409, 410, 419, 420, 421, 421, 525.6, 422, 423, 424, 474, 477, 475, 476, 529.3, 486, 488, 469, 491, 492, 508, 510, 525.1, 525.2, 511, 517, 518, 519, 546, 501; 280/780, 109, 110, 117, 118, 702, 711, 690, 704; 298/8 R, 11, 17.5, 17.7, 17.8, 22 R, 22 J, 22 D, 23 R, 231.1 D, 18

[56] References Cited

U.S. PATENT DOCUMENTS

| | | | |
|---|---|---|---|
| 3,083,983 | 4/1963 | Wettstein | 280/704 X |
| 3,921,839 | 11/1975 | Herpich | 414/408 |
| 3,998,491 | 12/1976 | Diem | 298/11 |
| 4,200,334 | 4/1980 | Lindholm | 414/421 X |
| 4,310,279 | 1/1982 | Johnston | 414/408 |
| 4,840,531 | 6/1989 | Dinneen | 414/409 |
| 4,978,271 | 12/1990 | Seader | 414/408 X |
| 5,205,698 | 4/1993 | Mezey | 414/409 X |
| 5,288,196 | 2/1994 | Horning et al. | 414/409 X |
| 5,316,430 | 5/1994 | Horning et al. | 414/409 X |

FOREIGN PATENT DOCUMENTS

| | | | |
|---|---|---|---|
| 1541769 | 9/1968 | France | 298/11 |
| 2653278 | 6/1978 | Germany | 280/704 |
| 1122581 | 11/1984 | U.S.S.R. | 414/408 |
| 8900928 | 2/1989 | WIPO | 280/704 |

*Primary Examiner*—Frank E. Werner
*Attorney, Agent, or Firm*—Baker & McKenzie

[57] ABSTRACT

This invention pertains to a combined refuse vehicle and refuse side loaded and recycling curbside collector vehicle. Recycled materials may be placed either in (i) a hopper which is elevated and tilted to discharge into the upper, open end of a recycling bin or (ii) to elevate roller cart vehicles into an upper loading position. In either event, the bins are side tilted and displaced transversely of the vehicle axis for roll-off clearance. Refuse is loaded at curbside level and forced into a packer body from the body up whereby previously charged refuse acts to compress subsequently charged refuse. A tag axle-drive axle system is disclosed which, by means of a proportioning valve, causes the legal loads on the tag axle-drive axle combination to be reached simultaneously.

11 Claims, 19 Drawing Sheets

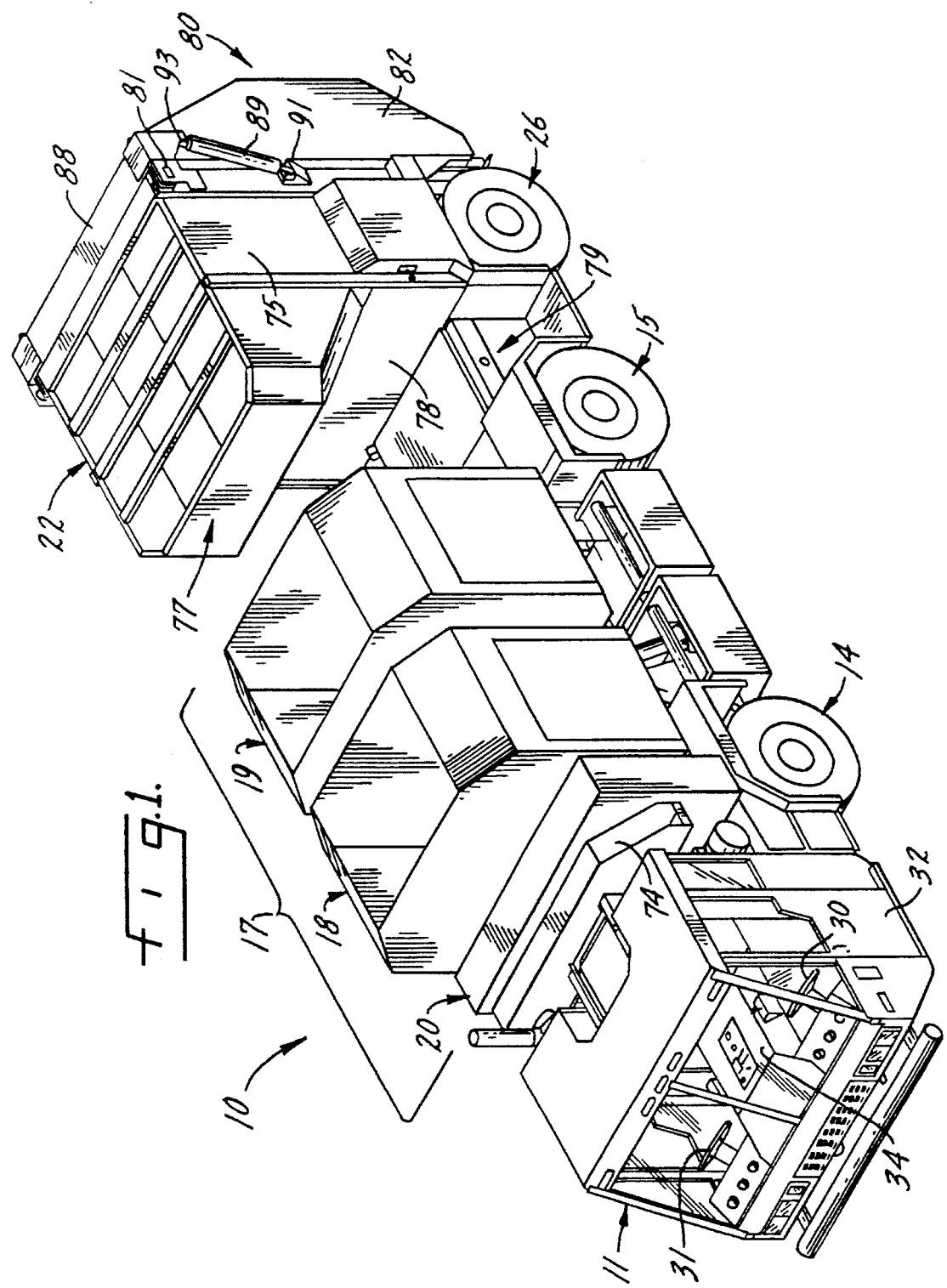

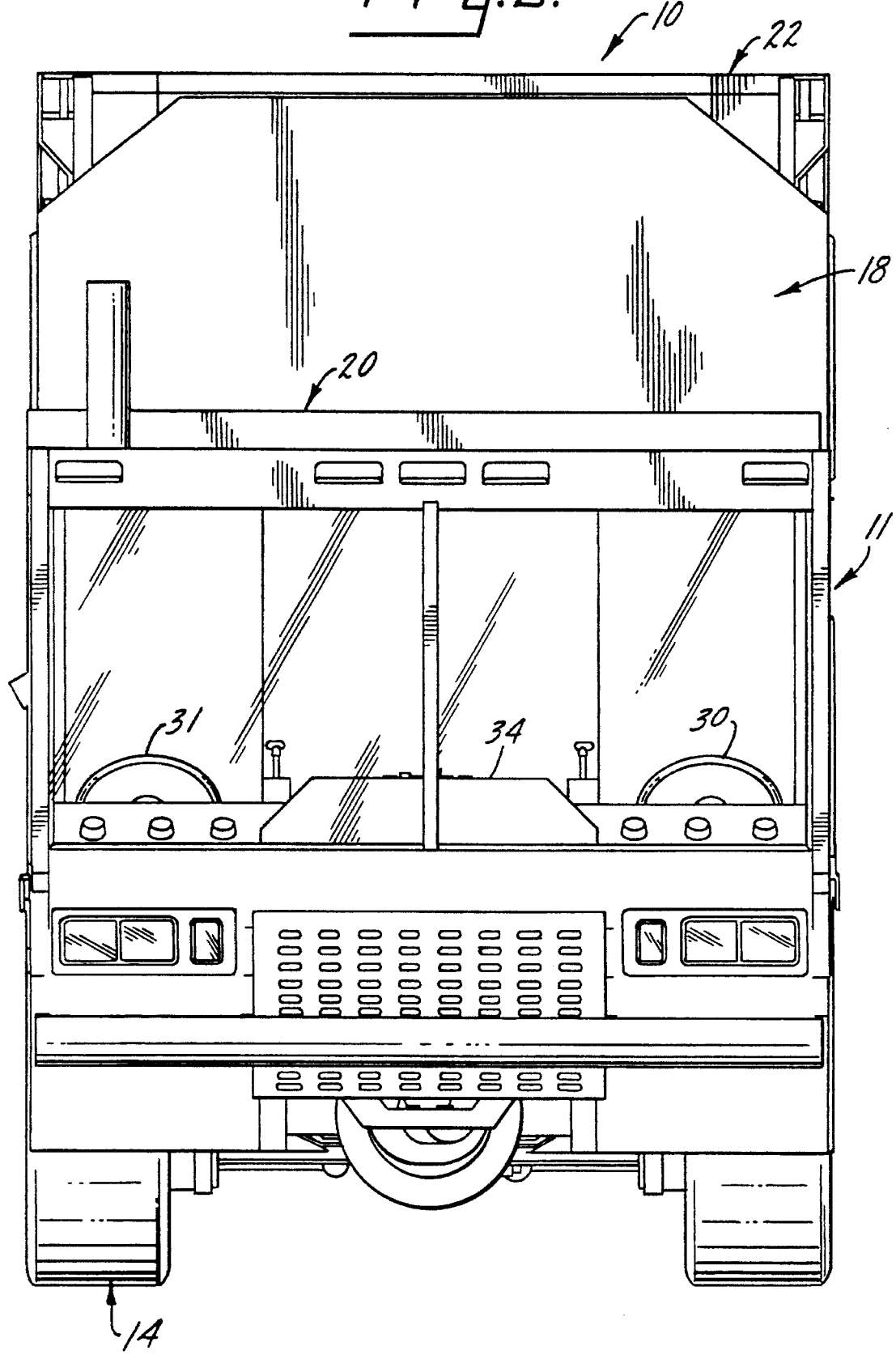

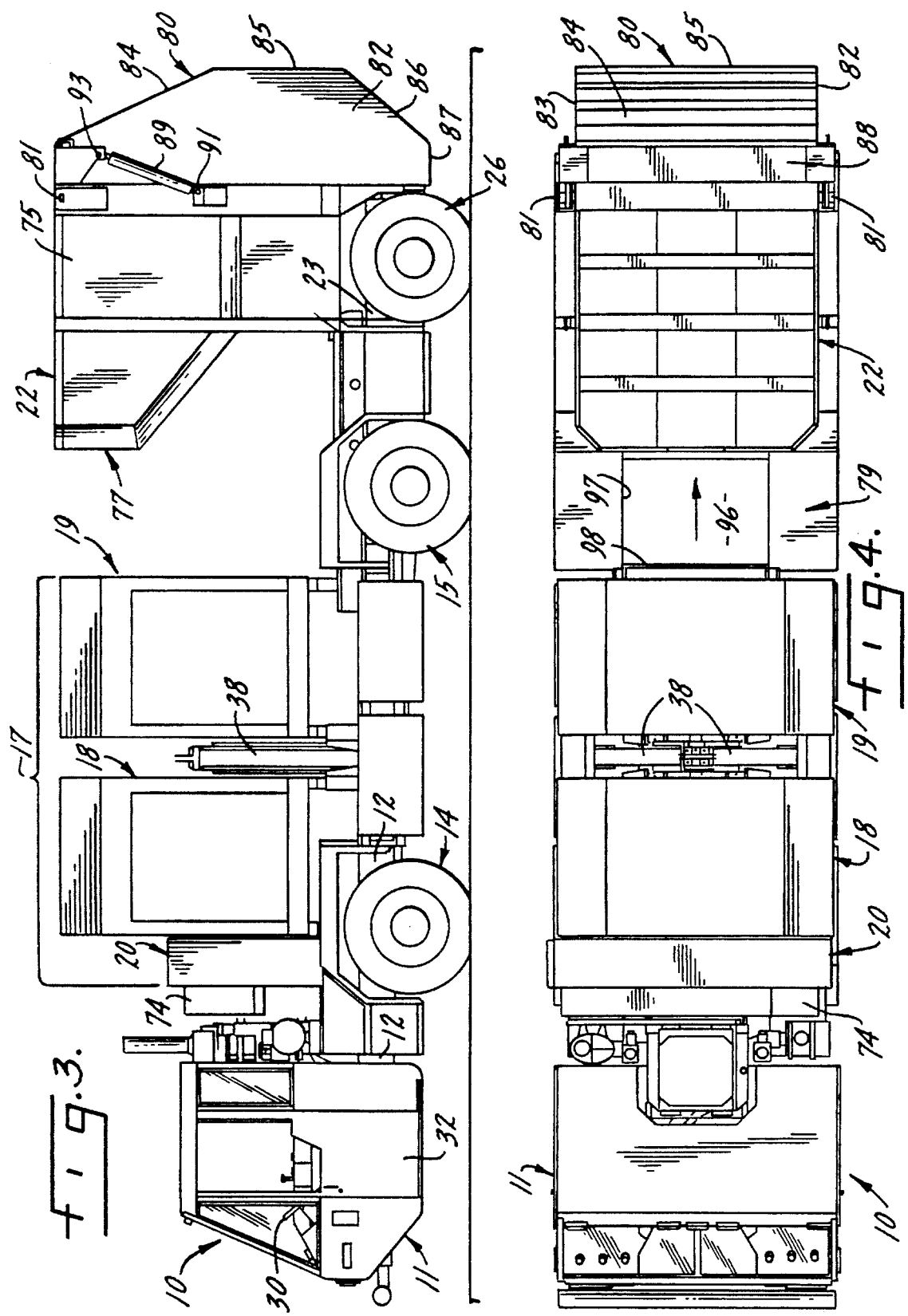

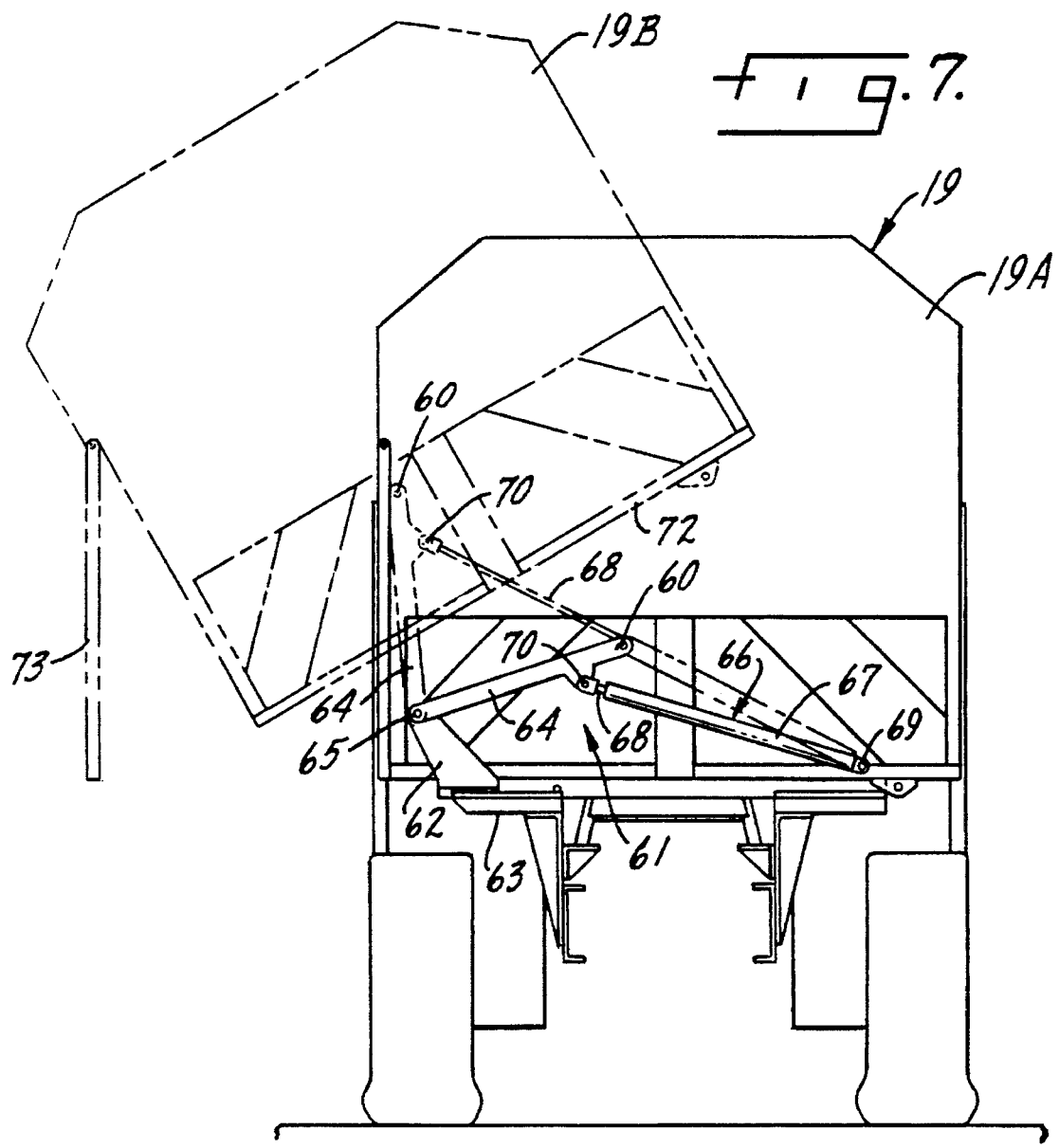

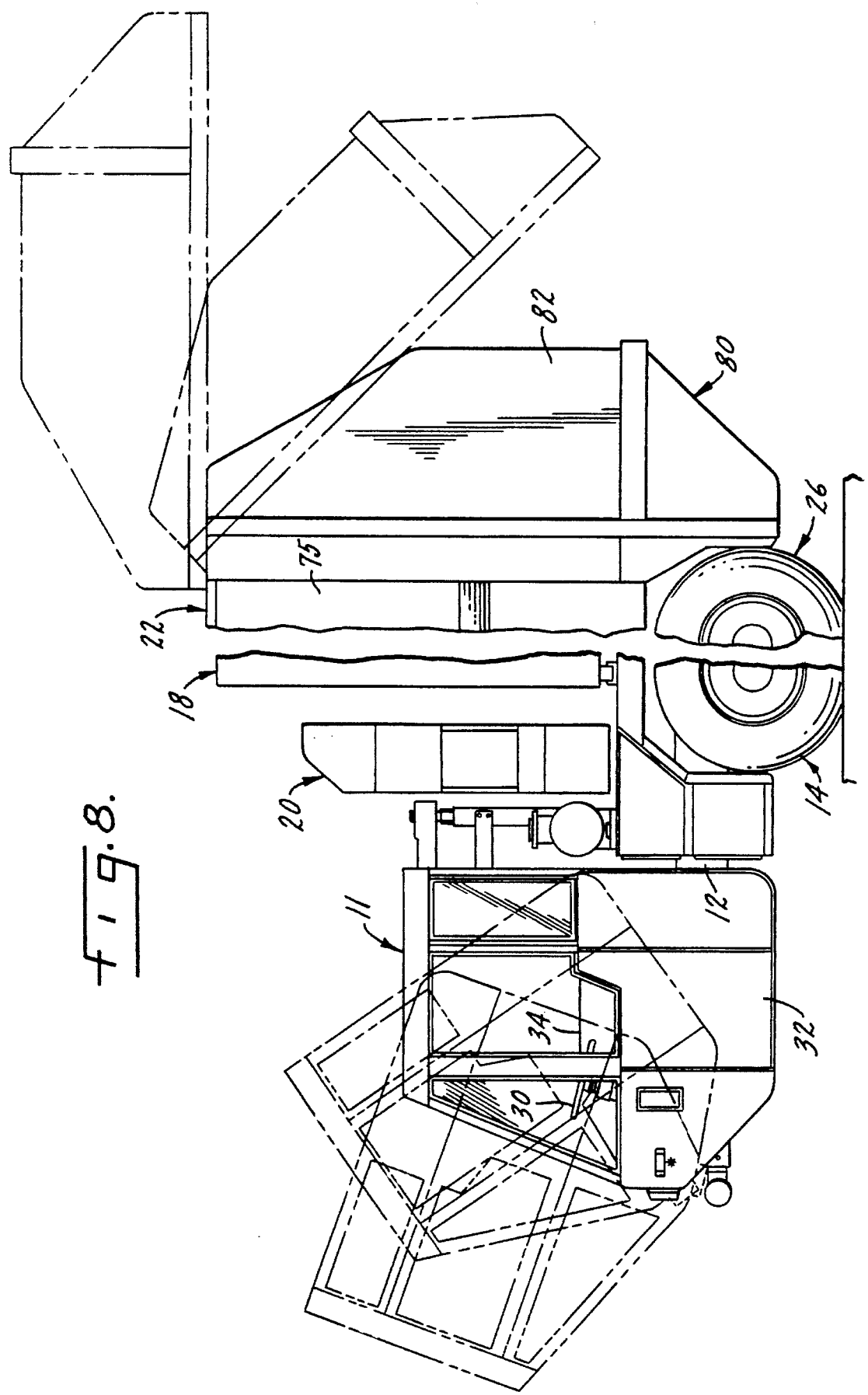

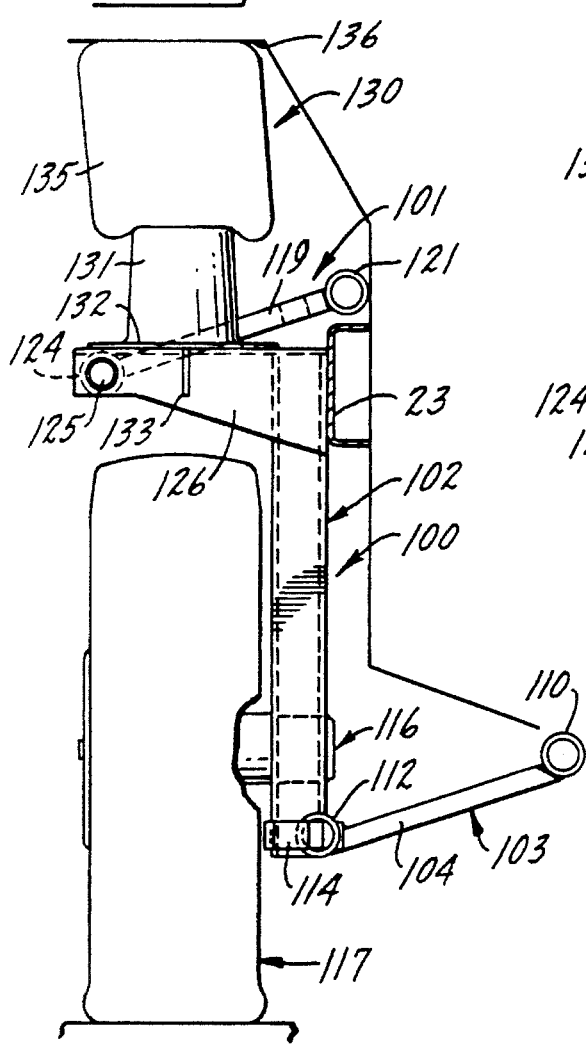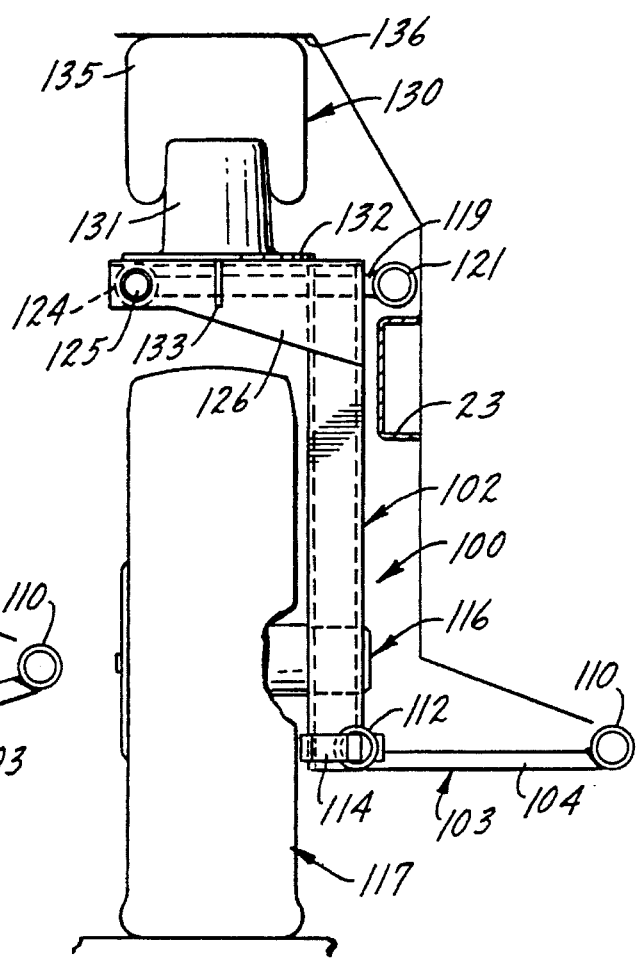

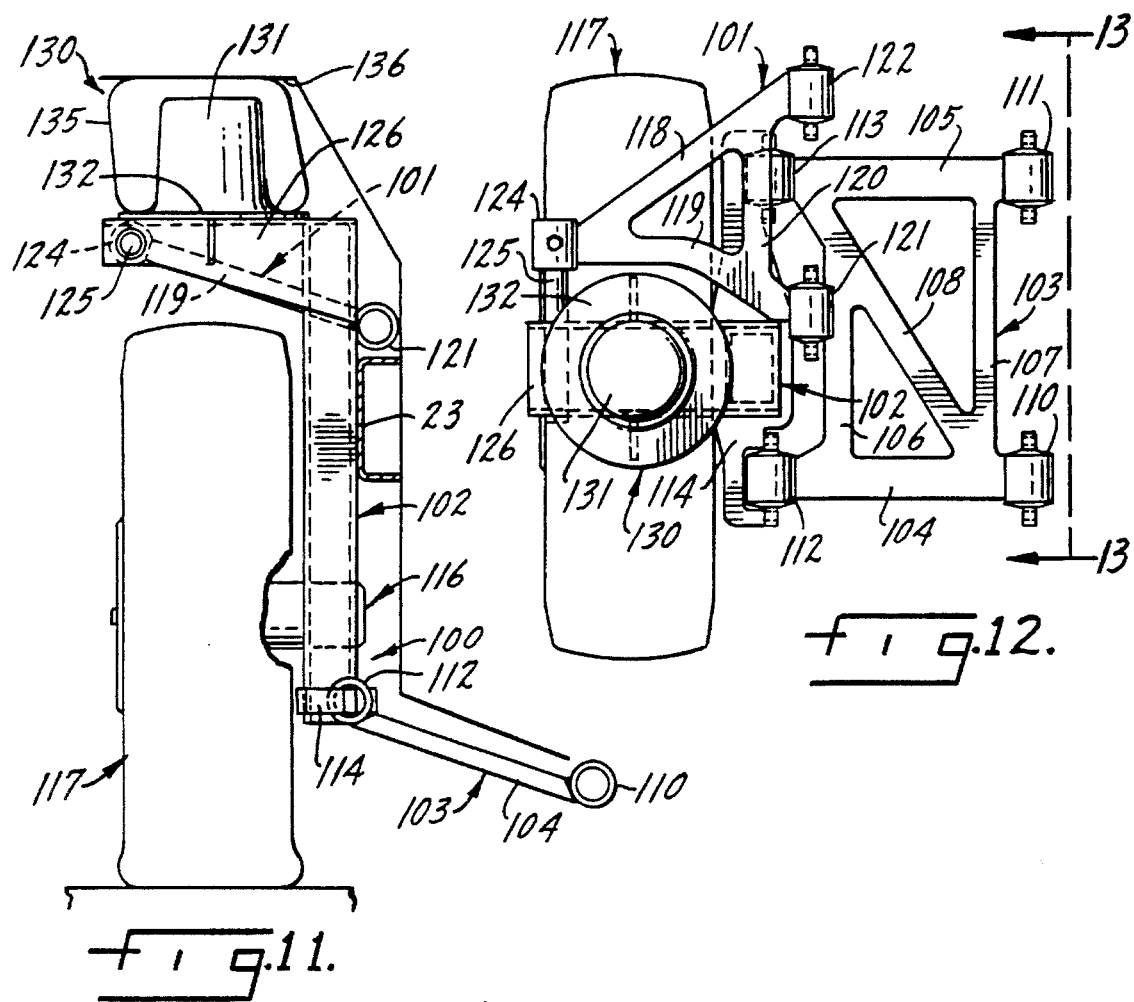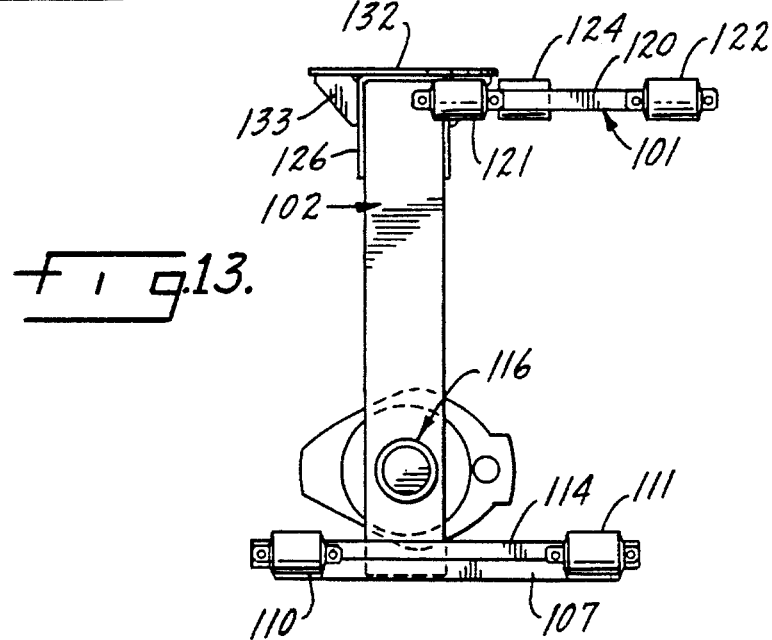

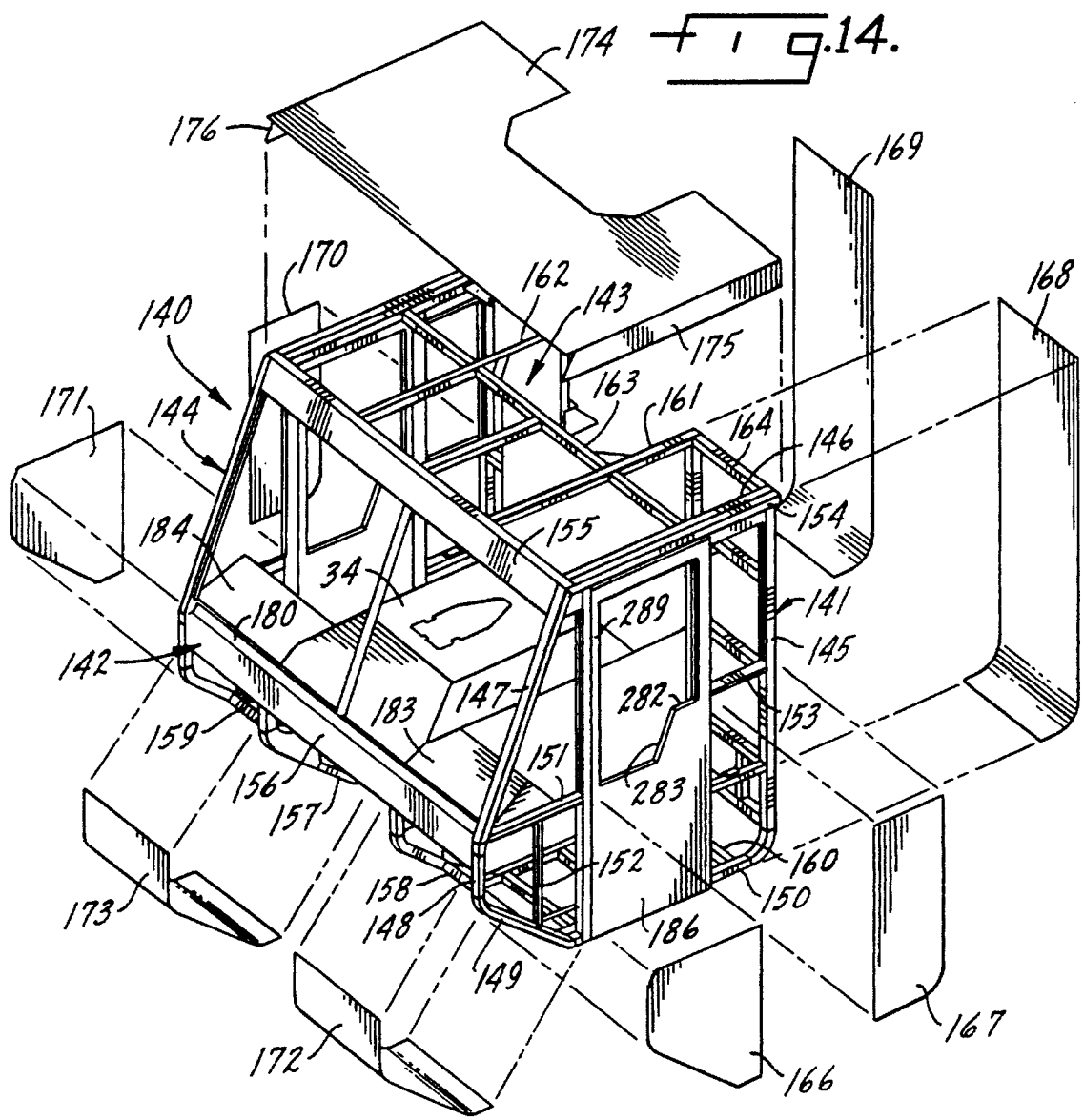
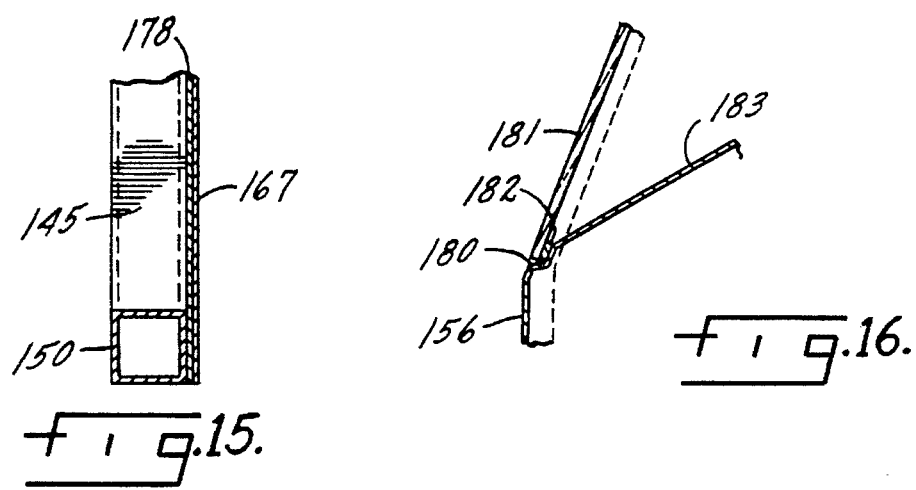

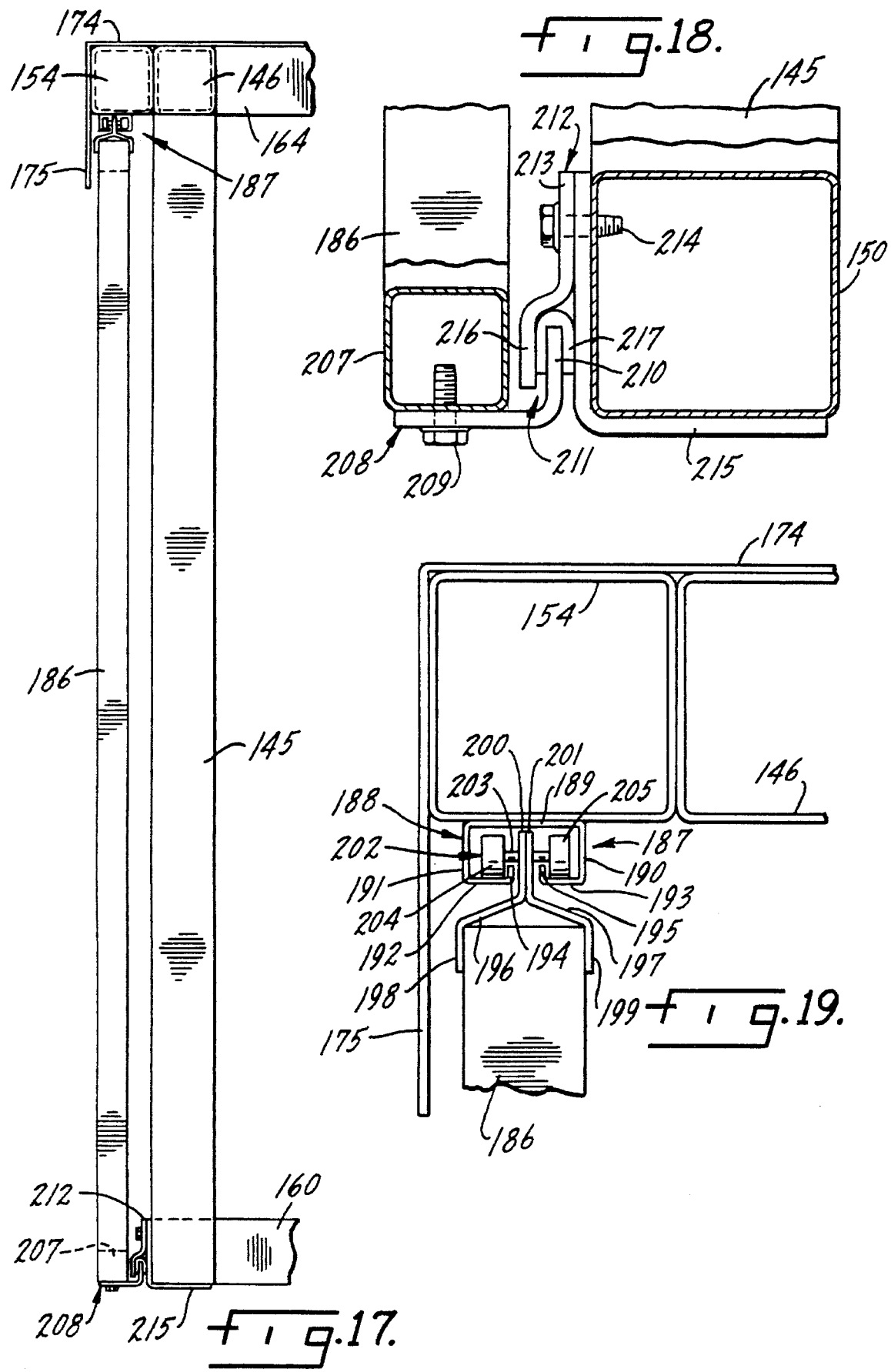

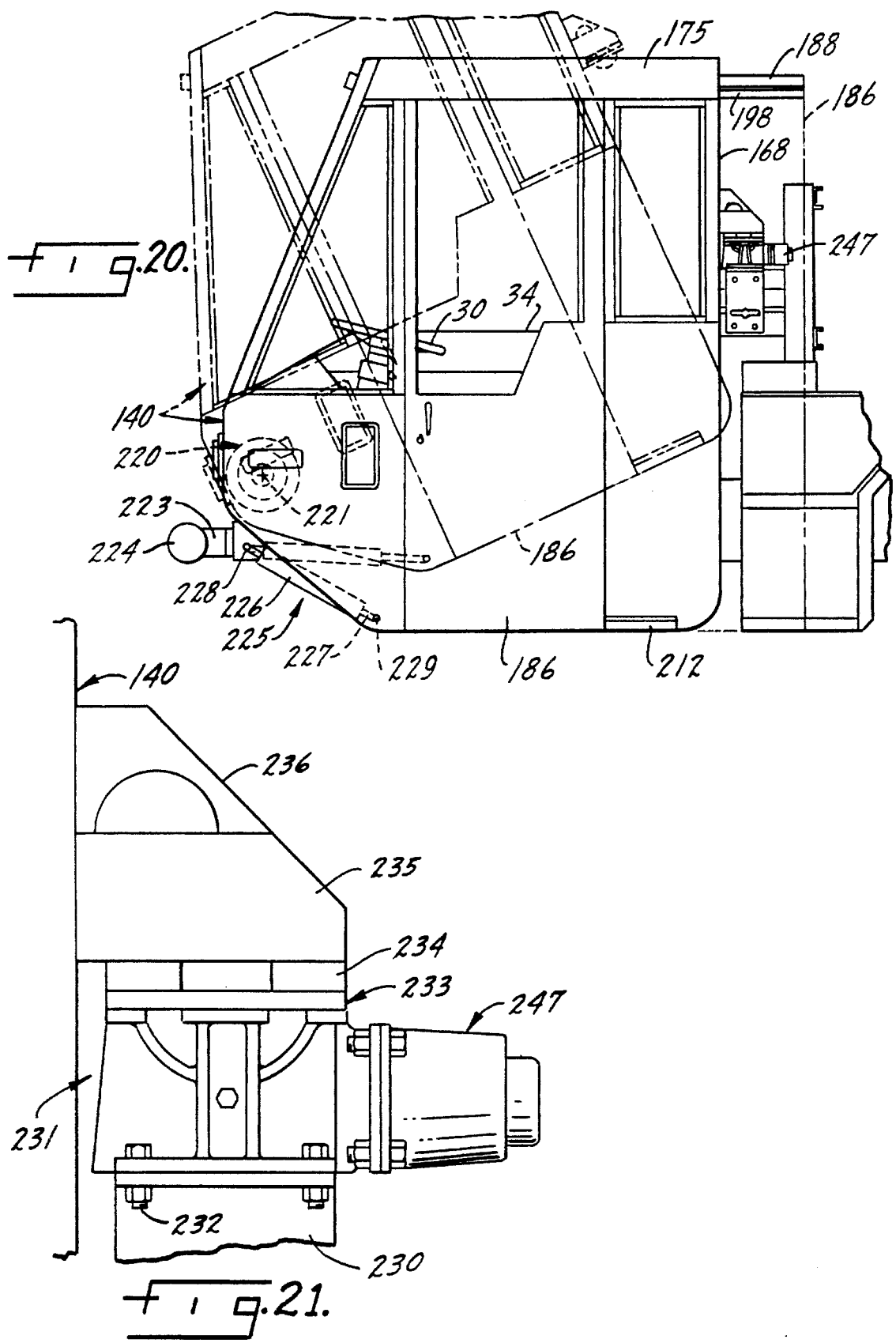

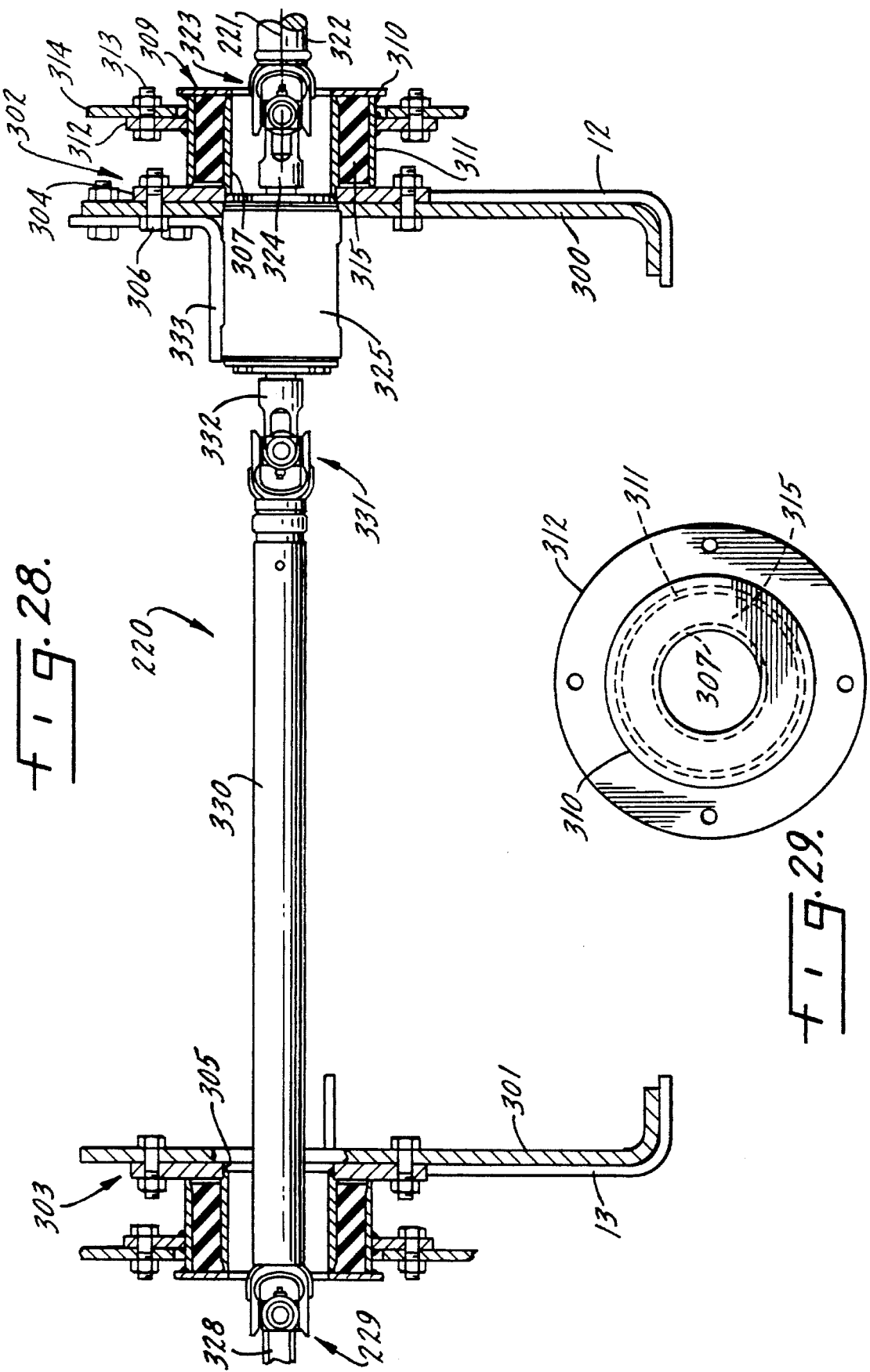

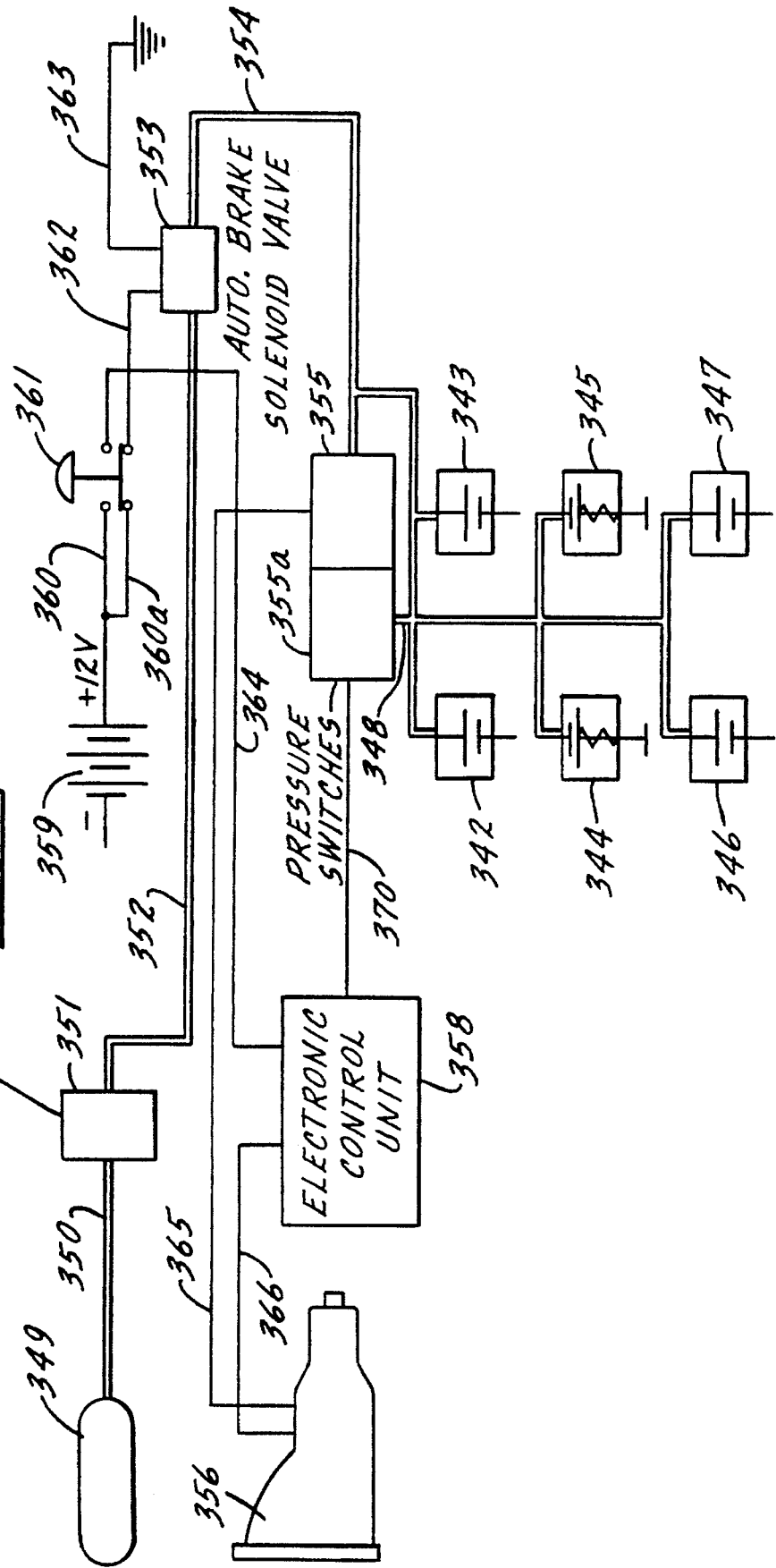

REFUSE VEHICLES

This application is a continuation-in-part of U.S. patent application Ser. No. 07/879,761 filed May 6, 1992, now abandoned.

This invention relates generally to waste management vehicles, and specifically to a vehicle which collects both refuse and recyclables at one stop, can be operated by one man, and which utilizes formerly wasted space in the conventional tail gate. The invention further relates to a new method of compacting refuse.

BACKGROUND OF THE INVENTION

Conventional waste handling systems used by public and private corporations generally require one vehicle to collect and discharge refuse, such as garbage, and a second vehicle to collect and discharge recyclable materials such as paper, glass, metal, and plastics. Most often such systems require two operators and hence many waste management systems consist of two fleets of separate and distinct vehicles, with four operators required to service a given pick-up route to collect and discharge wastes and recyclables.

Attempts have been made to combine the two functions of refuse handling and recycling in one vehicle but by and large such vehicles have not been totally satisfactory. Often two operators are required, and in many systems the capacity of the vehicle or its operating characteristics have precluded it from being a truly one man, economical, universal waste management vehicle.

One of the characteristics of current waste management vehicles is a relatively low load efficiency; that is, a low ratio of legal load to empty vehicle weight. Many such vehicles, for example, have only about a 70–75% ratio and this results in relatively high unit costs of operation when fuel and related factors, including the ratio of useable time to dead time, are taken into consideration. In this connection, the lack of utilization of the space taken up by the conventional tail gate is a significant factor since the weight of the tail gate is substantial and yet it performs no storage functions.

A further drawback of conventional waste management vehicles is the inability of those few systems which have attempted to employ a tag axle to evenly distribute weight, within legal on-highway load requirements, on the tag and drive axles as the load in the vehicle increases. Further, it appears that the ability to increase the load on the drive axle for off highway use, as in a landfill environment, at the expense of loading on the tag axle, has not been achieved in a one man combined refuse and recyclable vehicle.

In summary, there is a need in the waste management industry to reduce fleet size, route time and operational costs in the collection and discharge of refuse and recyclables.

DESCRIPTION OF A SPECIFIC EMBODIMENT

The present waste management invention described herein includes, in a single vehicle, (a) refuse and recyclable material collection, with either (b) side loading, or (c) curbside sorting of the recyclables, (d) one man operation, (e) a tag axle system in which load on the tag axle is sensed and the total load is applied to both the tag axle and its associated drive axle simultaneously so that the legal load limits on the tag axle-drive axle combination is approached substantially simultaneously, (f) has a high ratio of legal load to empty vehicle weight, (g) utilizes the entire cubic volume of the tail gate for refuse storage, (h) a tilting cab, (i) a short wheel base, (j) dual drive cab, (k) the option of handling 90 gallon roll out carts, and (l) recycling bins which tilt left to empty, have roll-off clearance, and are operable from inside the cab for optimal efficiency.

The invention also includes a unique method of loading refuse in which the force of gravity derived from previously loaded refuse acts in a direction to compact freshly loaded refuse up to the capacity of the refuse compartment which includes the tail gate.

BRIEF DESCRIPTION OF THE DRAWING

The invention is illustrated more or less diagrammatically in the accompanying drawing wherein:

FIG. 1 is a perspective view of the new refuse/recycler vehicle of this invention;

FIG. 2 is a front elevation view thereof;

FIG. 3 is a left, or street side, elevation view;

FIG. 4 is a top plan view;

FIG. 7 is a schematic section view of the recycler unloading system;

FIG. 8 is a diagrammatic left side view with parts broken away showing the cab tilting feature and the tail gate discharge;

FIG. 9 is a partial diagrammatic vertical section view through the tag axle assembly showing the tag axle in an unloaded position;

FIG. 10 is a partial diagrammatic vertical section view through the tag axle assembly showing the tag axle in a partially loaded condition;

FIG. 11 is a partial diagrammatic vertical section view through the tag axle assembly showing the tag axle in a fully loaded condition;

FIG. 12 is a partial diagrammatic horizontal section view through the tag axle assembly showing particularly the suspension assembly;

FIG. 13 is a view taken substantially along the line 13—13 of FIG. 12;

FIG. 14 is an exploded, diagrammatic view of the dual drive cab showing particularly the skin construction of the cab;

FIG. 15 is a partial, section view through a portion of a frame member illustrating the glued skin construction;

FIG. 16 is a partial section through the lower edge of one of the front windows near the center of the cab illustrating the securement of the front window to the cab frame;

FIG. 17 is a rear view of the left driver side door illustrating its suspension from the cab frame;

FIG. 18 is a detailed view to an enlarged scale as contrasted to FIG. 17 of the lower track system for the left driver side door;

FIG. 19 is a detailed view to an enlarged scale as contrasted to FIG. 17 of the upper track system for the left driver side door;

FIG. 20 is a left side view of the cab illustrating the tipping and latching features;

FIG. 21 is a side view to an enlarged scale as contrasted to FIG. 20 of the latching mechanism;

FIG. 28 is a front elevation to an enlarged scale as contrasted to FIG. 26 of the steering and cab pivot assembly;

FIG. 29 is a right side elevation of the outer race of the right cab pivot assembly;

FIG. 30 is a schematic diagram of the air and electrical system of the auto brake system;

DESCRIPTION OF A SPECIFIC EMBODIMENT

Figure 5:
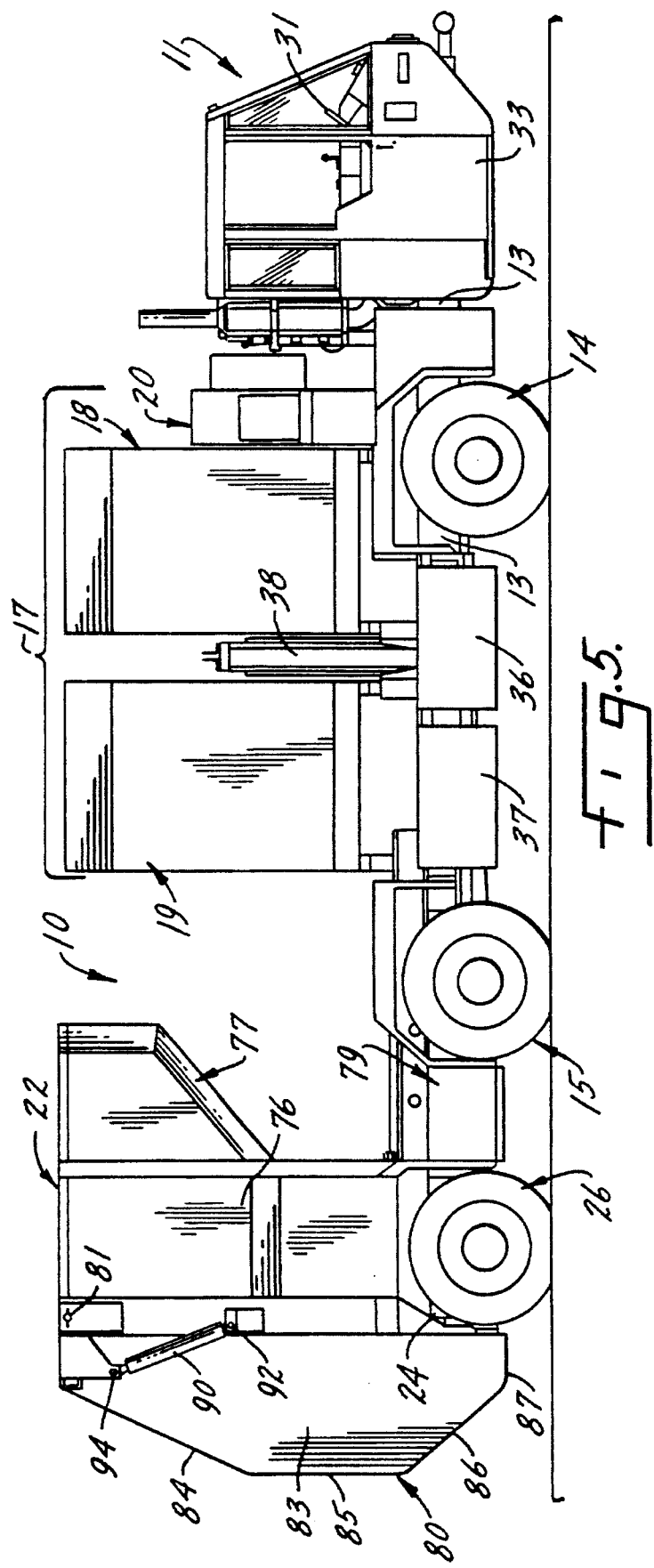
FIG. 5 is a right, or curbside, elevation view.

Like reference numerals will be used to refer to like or similar parts from Figure to Figure in the drawing.

The waste management vehicle which forms part of this invention is indicated generally at 10 at FIGS. 1–5. The vehicle is a dual function refuse sideloader and recycling curbside collector and may sometimes be referred to hereafter as a refuse-recycler, or an equivalent term. The refuse-recycler includes a cab, indicated generally at 11, mounted on the front end of a frame, the left and right side members of which are indicated at 12 in FIG. 3, and at 13 in FIG. 5. A front wheel and axle assembly is indicated generally at 14, and a rear wheel and axle assembly is indicated generally at 15, said front and rear axle assemblies being mounted on the frame. The axle of the front axle assembly 14 may, for example, be an Eaton axle, model EFA-20F4, with a rated capacity of 20,000 pounds and a cramp angle of 45 degrees. The non-steering rear axle of the rear axle assembly 15 may, for example, be an Eaton axle, model 26105D with a rated capacity of 20,000 pounds, a locking differential, and a gear ratio of 6:14:1. It will be noted that at this time 20,000 pounds is the maximum single axle load limit for Federal highways and most state highways, though not all. It should also be noted that the Federal highway, and most state highway, load limit for a tandem axle, with less than eight foot spacing, is 34,000 pounds.

A recycling body is indicated generally at 17, the body consisting of a bin indicated generally at 18, which may, for example, be adapted to receive and discharge paper, a bin indicated generally at 19, which may, for example be adapted to receive and discharge metal and glass, and a bin indicated generally at 20 which is adapted to receive and discharge plastic materials.

A refuse body is indicated generally at 22. The refuse body is mounted on an integrated tag axle frame, said tag axle frame including left side tag axle frame member 23, see FIG. 3, and right side tag axle frame member 24, see FIG. 5. It will be understood that the left and right tag axle frame members 23, 24 are connected by suitable means such as bolts to the left and right members 12, 13 of the recycler frame. This arrangement provides an unobstructed opening of maximum transverse width for an opening into and through which collected refuse is dumped preparatory to being moved to the extremity of the refuse container, and also a maximum width for a push plate to effect such a transfer, all as will be further described hereinafter.

A tag axle assembly is indicated generally at 26, said tag axle assembly being an Oshkosh independent air suspended tag axle with a rated capacity of 14,000 pounds.

The tag axle assembly 26 is preferably a non-driven, non-steerable axle which is connected by suitable pneumatic piping to the drive axle 15. The pneumatic system is arranged to maintain a slight pressure on the tag axle at all times to prevent it from bouncing during travel over pavement when the vehicle is unloaded. The tag axle may, however, be described as a "smart" axle because when the tag axle is unladened (except for the slight pressure mentioned above), the pneumatic system senses that no weight need be placed on the tag axle. In such a condition; i.e., a vehicle empty condition, the load on the drive axle may be about 13,000 pounds and this weight, plus the weight of about 17,000 pounds on the front axle assembly 14, gives a vehicle empty weight of 30,000 pounds. Since the bins 18, 19, 20 and packer 22 can carry about 24,000 pounds of load, it will be seen that the vehicle has an unusually high load to empty weight ratio. However, as the weight on the tag axle increases due to loading of refuse into refuse body 22, the pneumatic system proportions the load between the drive and tag axle assemblies. Specifically, a Midland proportional valve senses the position of the tag axle and/or the drive axle with respect to a reference datum, and then ratios the output versus the input pressure accordingly. By means of such a conventional proportioning valve the device has no need to control the pressure ratios and the tag axle assembly will slowly build, and both axles reach their above-mentioned load capabilities at the same time. As mentioned, said pneumatic system is arranged to put some load on the tag axle to prevent excessive bouncing on the pavement during on-highway travel. Another reason for such a "pre-load" is to reduce the possibility of vehicle pitching due to the substantial overhung mass of the refuse packer body. As a further feature, the pneumatic system is organized so that the driver, by actuating a switch, causes the system to increase the load on the drive axle from 20,000 pounds to 27,000 pounds for increased traction in a landfill environment, and, at the same time, reduce the tag axle load from 14,000 pounds to about 9,350 pounds and, also, reduce the front axle by about 2,350 pounds.

Referring now specifically to the cab 11, it will be seen that the cab is a spacious, low entry, dual drive cab having a steering wheel 30 in the left side drivers seat and a steering wheel 31 in the right side driver's seat. The dual controls are preferably connected by a shaft instead of the conventional chain and sprocket for greater ruggedness and better handling ability. Sliding door 32 on the left side of the cab and sliding door 33 on the right side of the cab provide the driver with a low entry to the cab, a spacious interior, and excellent visibility. Preferably the cab interior is arranged so that a driver or drivers can stand or sit, and the controls are replicated on either side of the engine housing 34 for more flexibility of operation. Referring now to FIG. 8, it will be seen that the cab 11 is arranged to tilt about a front axis so that easy access to the engine under housing 34 is provided.

Figure 6:
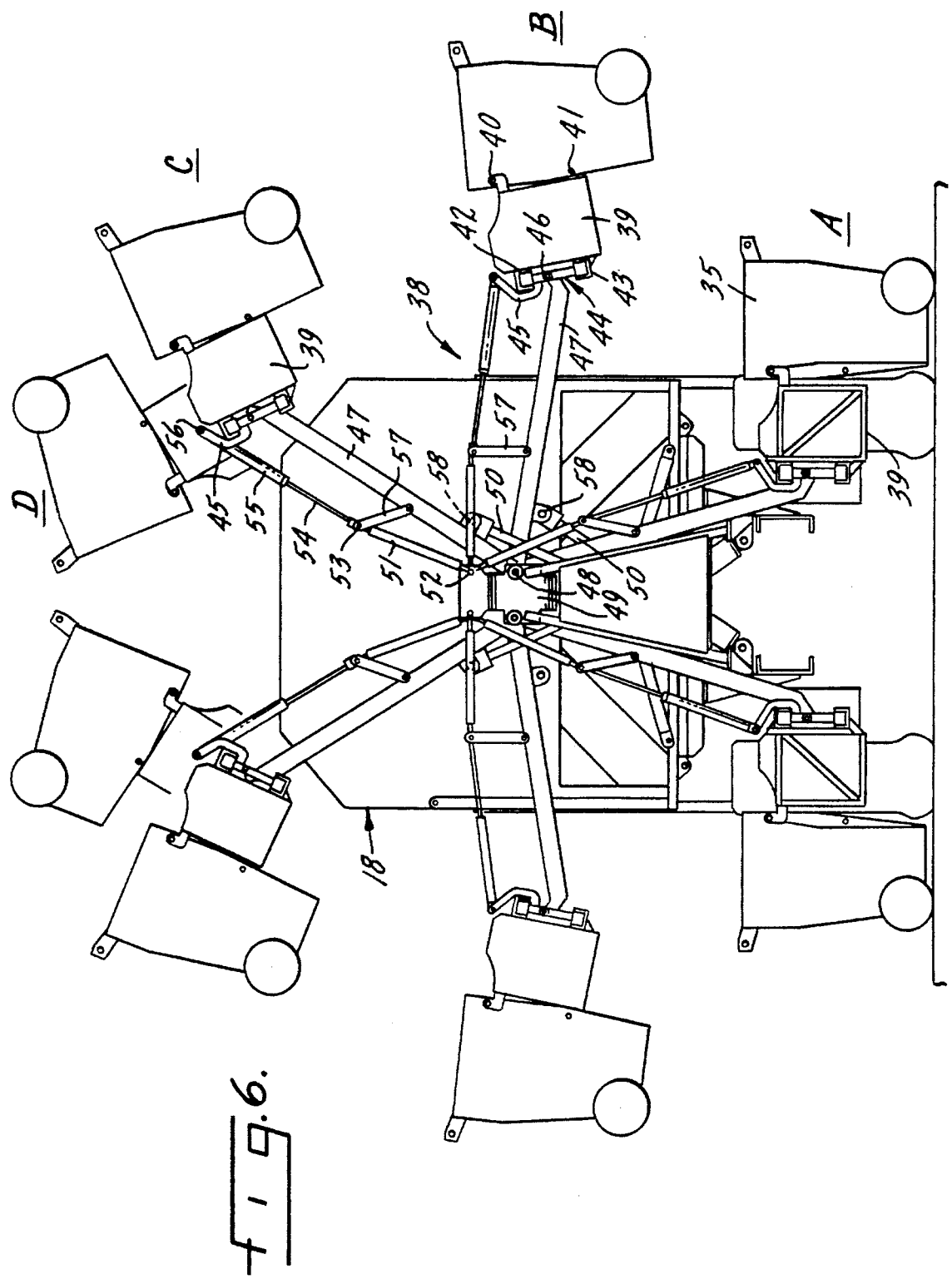
FIG. 6 is a schematic view of the recycler loading system.

The recycling body 17 is extremely flexible in that the bins 18, 19 are associated with conventional curbside collection as exemplified by FIGS. 1 and 3–5, and the conventional 90 gallon rollout carts as exemplified in FIG. 6.

With respect to the embodiment of FIGS. 1 and 3–5, the bins 18 and 19 may, for example, have a 7.5 cubic yard capacity each on a vehicle wheel base of 148". An open top collector hopper is indicated at 36 and another, if needed, at 37. Hopper 36 is mounted for horizontal movement on a track carried by a pivot arm, and the hopper and track assembly is mounted for elevation about a pivot carried by the truck frame, see pivot arm 38. It will be noted that the collection hopper is mounted, in a travel position, as illustrated in FIG. 1, at a height to be readily accessed from the curb. Once the hopper is in an elevated position, suitable linkage, to be described, tips the hopper to discharge into the selected one of bins 18 and 19.

Referring to FIG. 6, it will be seen that in this instance the recycling system has been adapted for use with conventional roll-out carts, a standard size of which is 90 gallons. A cart 35 at position 6A has been attached to pivot arm assembly 38 at the curbside loading location. After attachment to the pivot arm assembly the arm commences its upward travel and position B represents the cart in the approximate midpoint of its discharge travel. It will be noted that the cart is connected to a carrier 39 at two securement locations 40, 41. The carrier 39 in turn is arranged to slide horizontally on rails 42, 43, which in turn are the upper and lower members of a frame, indicated generally at 44, which is pivotally connected to a tipping link 45 at 46. The pivot 46 is carried by a main swing arm 47 which is pivoted at 48 to a rigid extension 49 from the chassis, A fluid cylinder and piston assembly whose cylinder end is pivotally mounted to the chassis has a piston rod 50 whose distal end is connected to the main swing arm 47 at 58.

The mechanism for actuating the tipping link 45 when the cart reaches tipping-ready position C includes a first link 51 which is pivotally connected at 52 to the extension 49 of the chassis. The distal end of the first link in turn is pivotally connected, as at 53, to one end of the piston rod 54 which projects from fluid pressure cylinder 55. The bottom end of cylinder 55 in turn is pivotally connected as at 56 to the distal end of tipping link 45.

From reference to tipping-ready position C it will be noted that when the rod 54 of tipping cylinder 55 is in the illustrated, fully extended position, the cart 35 is in only a slightly inclined position. However, when the piston and cylinder assembly is operated to retract rod 54 with respect to cylinder 55, the result is to exert a counterclockwise movement to tipping link 45 about pivot 46. This action moves the cart from the tipping-ready position of C to the discharge position D. A pivotally mounted brace link is indicated at 57 to maintain the rod and piston in the correct relationship to the main swing arm 47 at all times.

From a study of the left side of FIG. 6 it will be noted that the identical sequence of events occurs from the left, or street side, of the vehicle. Since the operation from the street side is the same as that just described, street side loading need not be further described in detail.

One of the unique aspects of the invention is the left side discharge feature with roll-off clearance shown best in FIG. 7.

Each of bins 18, 19, is, in effect, articulately connected to the truck chassis and hence is capable of being elevated above the truck frame, tilted, and discharged with roll off clearance. As best seen in FIG. 7, bin 19 is pivotally connected at 60 to discharge linkage indicated generally at 61. The discharge linkage includes a pivot post 62 whose base is welded or otherwise suitably secured to vehicle cross frame member 63. A rigid link 64 is pivoted at its left end to pivot post 62 at 65. The link 64 is pivoted counterclockwise around pivot 65 by a cylinder assembly, indicated generally at 66, which includes cylinder 67 and rod 68. The base or right end of cylinder assembly 66 is pivotally connected to vehicle cross frame member 63 at 69, and the distal end of rod 68 is pivotally connected to the rigid link 64 at 70.

Preferably a stabilizing link which controls the back side of bin 19 is also employed. Such a link would have one end pivotally connected to the underside of bin 19 at or near the right edge thereof, as viewed in FIG. 7, and the other end connected to cross frame member 63, preferably to the right of pivot post 62 and to the left or the center of the vehicle. This link is not shown for purposes of clarity.

From the foregoing it will be seen that as rod 68 is extended, link 64 will swing counterclockwise around its fixed pivot 65 and bin 19 will be both lifted, slightly, and tilted in a counterclockwise direction from the 19A curbside loading position to the 19B recycling discharge position. Due to the inclination of floor 72 and the opening of side door 73 after unlocking under the influence of gravity, recyclable materials in bin 19 will be quickly discharged. The retraction of rod 68 will, of course, return bin 19 to its over the road and curbside loading position of 19A.

Plastics bin 20 includes a chute having an opening 74, see FIGS. 1, 3 and 5, into which plastic articles may be loaded at curbside, see FIGS. 1 and 3.

Referring now to FIGS. 1, 3–5 and 8, the refuse body 22 and its mode of operation will now be explained. The refuse body includes fixed rectangular sidewalls 75, 76 which are secured by welding or other suitable means to the tag axle frame member 23. A chamber extension which has a generally trapezoidally shaped inside contour and which extends forwardly is indicated at 77. A front wall 78 closes the area beneath the chamber extension 77 and above the loading zone or compartment 79. The rear of the refuse body is closed by tailgate 80 which, as best seen in FIGS. 1 and 4, is pivoted to the balance of the refuse body at 81. The tailgate includes sidewalls 82, 83, rear walls sections 84, 85, 86, bottom wall 87 and top wall 88. A pair of cylinder assemblies 89, 90 each has the base of the cylinder pivoted to the fixed body at 91, 92, respectively, and the distal end of the extending and retracting rod pivoted at 93, 94, respectively, to a rod block fast with the sidewalls 82, 83 respectively. Upon extension of the rod from the position shown in FIGS. 1, 3 and 5, the tailgate 80 will move to the upper-most position illustrated in FIG. 8 preparatory to discharge of refuse.

Refuse is loaded into the refuse body 22 through an opening 96, see FIG. 4, in a trough 97 whose left end is formed by a push plate 98 which moves in the direction of the arrow in FIG. 4 to move refuse just dumped into the open top trough into the tailgate beneath front wall 78. As material is progressively dumped into the opening 96 in trough 97 and thereafter loaded into tailgate 22 by the rearward travel of push plate 98, the refuse will pack into the tailgate from the bottom up. The greater the volume of refuse in the tailgate, the more tightly each new batch of refuse will be compressed because the greater volume will be resisting the packing force exerted on the fresh batch by the refuse already packed into the tailgate. It will be noted that in FIG. 4 the push plate 98 is in a retracted position.

To discharge refuse, the tailgate 22 is raised to its highest position illustrated in FIG. 8. The bulk material stored therein is discharged under the combined forces of gravity and the positive ejecting force derived from moving push plate 98 to the extreme right end of its path of travel as viewed in FIGS. 1 and 3.

The unique tag axle suspension system of this invention is illustrated in FIGS. 9–13. Referring first to FIG. 9, the rigid side frame member of the vehicle chassis is indicated at 23. The tag axle suspension linkage is generally Z-shaped in transverse cross-sectional configuration, as seen in FIGS.

9–11, and is indicated generally at 100. The linkage includes an upper arm assembly, indicated generally at 101, an upright assembly, indicated generally at 102, and a lower arm assembly, indicated generally at 103.

The lower arm hS a generally rectangular or H-shaped configuration as best seen in FIG. 12. Specifically, the arm includes transverse end members 104, 105, longitudinal members 106, 107, and an angular cross brace 108. The inner ends of the end members 104, 105 include pivot connections 110, 111 which secure the suspension assembly to the vehicle chassis. The outer ends of end members 104, 105 include pivot connections 112, 113 which pivotally secure the H-arms to support member 114.

The upright assembly 102, which is rectangular in cross-sectional configuration as can be most readily appreciated from FIG. 12, is welded or otherwise suitably secured to the upright support member 114 between its ends, as can be best seen in FIGS. 12 and 13. Upright 102 carries the spindle, indicated generally at 116, on which is mounted the wheel and tire assembly indicated generally at 117.

The upper arm assembly 101 has a generally A-shaped configuration as can be best seen in FIG. 12. It includes two angular struts 118, 119 and a base strut 120, the latter being seen best in FIGS. 12 and 13. The inward ends of struts 118, 119 carry pivot connections 121, 122 which pivotally connect the inside ends of the A-arm to tag axle frame member 23. The apex of the angular struts carries a pivot connection 124 which pivots about pivot pin 125 which in turn is fast with extension 126 carried by upright assembly 102.

An air spring is indicated generally at 130. The air spring includes a piston 131 mounted on a plate 132 which is welded by generally triangular braces 133 to the side flanges of the inverted, U-shaped extension 126 from upright assembly 102. The air spring balloon is indicated at 135, its upper end bearing against the underside of the packer body chassis, indicated generally at 136, in load bearing relationship.

Referring now to FIGS. 14, 15 and 16, the unique glued skins construction of a cab is there illustrated. The cab frame, indicated generally at 140, includes a left side, indicated generally at 141, a front, indicated generally at 142, and a top, indicated generally at 143. It will be understood that the right side, indicated generally at 144, is a replica of left side 141 and hence only left side 141 need be described in detail.

The left side 141 of a cab frame 140 includes a plurality of, preferably, square tubes welded or otherwise suitably secured to one another to form a rigid unitary structure. A rear member is indicated at 145, a top member at 146, a downwardly and forwardly sloping front member at 147, a vertical front member at 148, a downwardly and rearwardly sloping member at 149, and a bottom member at 150. Reinforcement braces are indicated at 151, 152 and 153. The square tubes may, for example, be about 2"×2" so as to present a flat base surface for the reception of an adhesive, and be welded to each other at junctions. A door suspension tube is indicated at 154 to be described in detail hereinafter.

Front 142 includes header 155, panel anchor brace 156, a plurality of lower struts, one of which is indicated at 157, and left and right bottom headers 158, 159, respectively, the inner ends of the headers terminating short of the center line so as to provide an open space to accommodate the engine. A lower left brace is indicated at 160; similar braces are not numbered for purposes of clarity.

Top 143 includes longitudinal stringers 161, 162 which are maintained a fixed distance from one another by spacer 163. Stringer spacers are indicated, for example, at 164.

From the above description it will be seen that the exterior surfaces of the cab frame are flat.

A plurality of panels which, together, form the cab skin are illustrated in an exploded position for clarity. Thus a lower left side panel 166 in the form of a flat, generally pentagonal shaped sheet is contoured to be adhered to left side brace 151, vertical left member 148, and inclined lower member 149. Lower right side panel 167 is adhered to brace 153, left rear member 145 and left bottom member 150. The housing is completed by left and right rear panels 168, 169, right side panels 170, 171, front panels 172, 173, and a top panel 174 which has downwardly depending side flanges 175, 176. As can be best visualized from FIG. 14, each of panels 166–174 has a flat surface where it contacts the square tubes which comprise cab frame 140 to provide a substantial adherence area between the cab frame and the panels.

FIG. 15 is a representative section through the lower portion of bottom member 150 and panel 167 which illustrates the adherence of the panel to the square tubes comprising frame members 150 and 154 by a layer of adhesive 178 on the contacting areas of the tubes and panel.

From FIG. 16 it will be noted that the upper portion of panel anchor brace 156 has been indented at 180 to receive the base of left windshield 181 which is secured to the upwardly inclined portion of indentation 180 by a layer of adhesive 182. It will be noted that left and right dash panels 183, 184 are formed as extensions of the upper left and upper right of the panel anchor brace 156.

The cab door and its suspension from cab frame 140 is illustrated best in FIGS. 17–19 which can be thought of as a view from the rear of the left side of the cab frame looking forward. Thus it will be noted that left door 186 is suspended for a sliding movement with respect to door suspension tube 154 by a suspension assembly indicated generally at 187. Suspension assembly 187 includes a roller guide, indicated generally at 188, formed from a header 189, inner 190 and outer 191 side walls which depend downwardly from the header 189, roller tracks 192 and 193, and guide flanges 194 and 195 which function to confine the rollers to a linear path.

A pair of strap brackets 196, 197 have their respective lower ends 198, 199 welded to the upper, inner and outer surfaces of door 186 and their upper ends 200, 201 welded to one another. A dumbbell shaped roller, indicated generally at 202, includes a shaft 203 which passes through aligned apertures in the upper bracket ends 200, 201 and rollers 204, 205 which in turn ride on the outer and inner roller tracks 192 and 193 within the horizontal confinement of side walls 190, 191 and guide flanges 194, 195.

The bottom of left door 186 is formed from the square base tube 207 which is secured to bottom guide member or door retainer 208 by any suitable means such as bolt 209. The inner portion of the door retainer 208 is upturned, as at 210, so as to fit within a bottom guide assembly or door track bracket indicated generally at 211. The bottom door track bracket 211 consists of guide plate 212 extending the width of the door, the upper end 213 of which is secured, as by bolt 214, to an L-shaped anchor plate or a cab reinforcement bracket 215 which fits snugly against cab frame bottom tube 150. The lower portion 216 of the guide plate 212 is space outwardly from anchor plate 215 to provide a space to receive the vertically oriented inner end 210 of the door retainer. A plastic or rubber-like cap or wear strip 217 which slips over the top end of inner end 210 is compressible and extendable to a slight degree ensures smooth, quiet vibration-free movement of the door retainer 208 within the confined space between the lower portion 216 of the door retainer and the vertical wall portion of the L-shaped cab reinforcement bracket 215.

The width to which the door 186 can be opened is shown by the dotted line in FIG. 20 which shows the limit of the rear movement of the left door 186. From this view it will be noted that the door slides to a position rearwardly spaced from left rear panel 168 a distance sufficient to provide a very wide unobstructed entry to the cab.

Referring now to FIGS. 20–23, the cab tilt feature and the cab lock mechanism are there shown.

The cab frame, including the exterior panels as illustrated in FIG. 14, are mounted for a pivoting movement around a steering shaft assembly, indicated generally at 220, which will be described in detail hereinafter. Specifically, the engine cowling 34 will pivot with the cab frame but the steering wheels 30, 31 will remain stationary.

Referring first to FIG. 20, a chassis cylinder mount which is integral with the chassis is indicated at 223. The cylinder mount carries a bumper 224 of any suitable construction; a heavy steel tube is preferred. A cab tilting assembly is indicated at 225, the assembly including a cylinder 226 and an extensible and retractable piston rod 227. The left end of the cylinder assembly 225 is pivotally connected to the chassis 223 at 228. The distal end of the piston rod is pivotally connected to the cab frame 140 at 229. From FIG. 20 it will be noted that when the cylinder 226 is pressurized to extend rod 227 outwardly away from cylinder connection 228, the cab, when unlatched from the chassis as described hereinafter, will pivot counterclockwise about cab pivot axis 221 to swing or tilt the cab 140 from the solid line position of FIG. 20 to the dotted line position, or preferably beyond. With the cab tilted the engine and front end are exposed for inspection, maintenance, repair and replacement.

Figure 22:
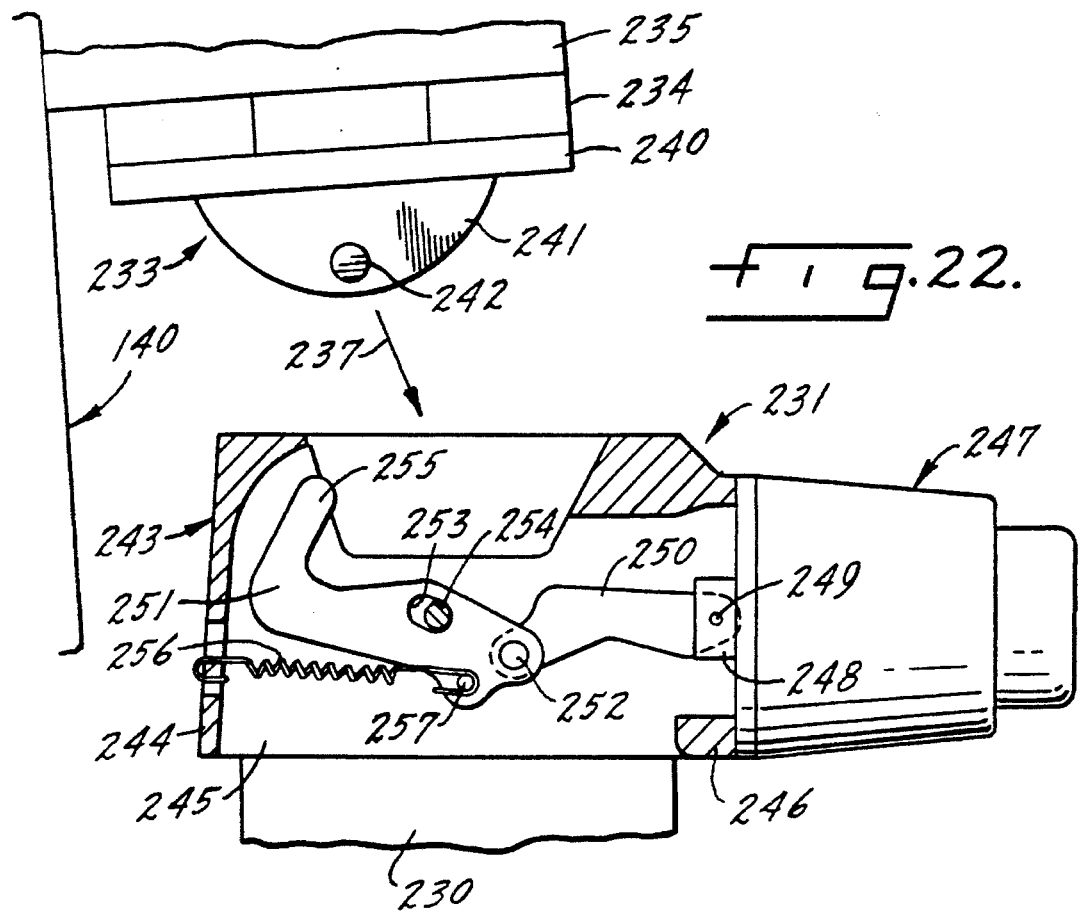
FIG. 22 is a detail of the latching mechanism.
Figure 23:
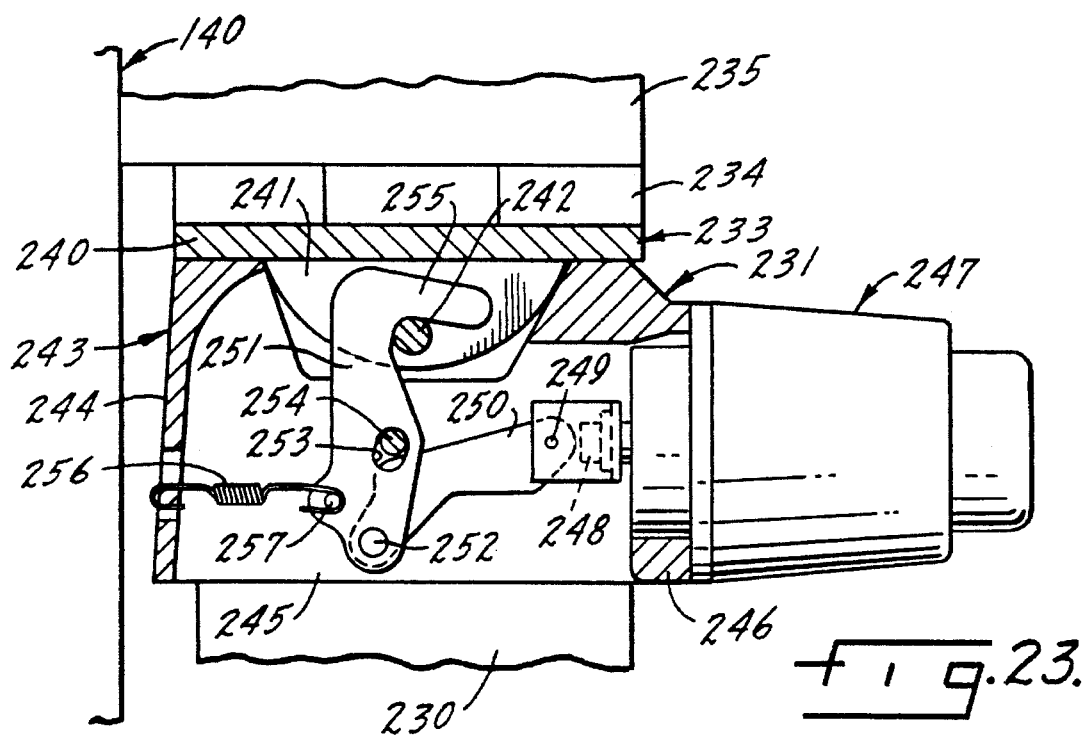
FIG. 23 is a further detail of the latching mechanism.

Means for locking and unlocking the cab frame 140 from the vehicle chassis are indicated in FIGS. 21–23. Referring first to FIG. 21 a mounting structure integral with the chassis is indicated at 230. The lower portion of a hydraulic hook assembly is indicated generally at 231, said lower hook assembly being secured to the chassis mount 230 by a suitable securing means such as bolts 232. An upper latch pin assembly is indicated generally at 233 whose structure and mode of operation is more clearly shown in FIGS. 22 and 23. A rubber isolator is indicated at 234, the isolator being carried by an omni-directional motion, isolator 235 which in turn is carried by the rear cab mount bracket 236 which is integral with the cab frame 140.

Referring now primarily to FIGS. 22 and 23, the structure and operation of the latching mechanism is shown in greater detail. The latch pin assembly 233, which is mounted on the cab frame 140, includes a latch plate 240 from which depends a pin carrier 241 which carries latch pin 242. It will be understood that the pin carrier 241 is preferably a pair of similar shaped plates with the latch pin 242 anchored at each of its ends in a respective pin plate. In the position illustrated in FIG. 22, the latch pin assembly 233, which moves with cab frame 140, is approaching the latch hook assembly 231 as indicated by arrow 237.

The latch hook assembly 231 includes a housing, indicated generally at 243, having front wall 244, right side wall 245 and rear wall 246 which has an enlarged opening therein. The latch hook housing is attached to the chassis by bolts 232, seen best in FIG. 21.

A hydraulic cylinder assembly is indicated generally at 247, the cylinder assembly including a piston rod 248 which is connected by pivot pin 249 to a first link 250. A second link, which functions as a latch hook, is indicated at 251, link 251 being pivotally connected to first link 250 at 252, pivot 252 being a floating pivot. A lost motion slot is indicated at 253 and a ground pivot at 254, the ground pivot 254 being secured to the side walls of the latch hook housing 243. The latch hook 251 terminates in a keeper 255 which is adapted to engage the latch pin 242 as will be described hereinafter. A tension spring is indicated at 256 with its front end anchored in the front wall 244 of the latch hook housing and its rear end connected to a spring anchor pin 257 carried by the lower end of latch hook 251. In the position of FIG. 22, spring 256 urges latch hook 251 in a clockwise direction about ground pivot 254, but the pressure in the hydraulic cylinder assembly 247 precludes clockwise movement.

The latching mechanism is shown in an engaged position in FIG. 23. In this Figure the cab frame 140 has tilted clockwise to a position at which the cab latch plate 240 engages the upper surface of latch hook housing 243. In this position the pin carrier 241 is received within the opening in the upper wall of latch hook housing 243 and hence latch pin 242 comes to rest in a position in which it lies within the arc of swing of latch hook 251 about ground pivot 254. The piston 248 has been extended forwardly thereby advancing first link 250 and causing latch hook 251 to pivot about ground pivot 254 so as to drive keeper 255 over the latch pin 242. Both the pressure in cylinder assembly 247 and spring 256 act in a direction to cause the latch pin 242 to seat in the bight at the outer end of the latch hook. It will be seen that any tendency of the cab frame 140 to rotate in a counter clockwise direction as viewed in FIG. 23 will only cause the latch pin 242, and hence the cab frame 140, to tighten to a greater degree after the slight upward movement permitted by the clearance in lost motion slot 253 is taken up.

Hence, the entire cab frame 140 pivots easily about cab pivot axis 221 at least 90° so as to expose the engine and chassis to ready access for repair, maintenance or replacement, and yet the cab and chassis, when secured to one another, are positively locked to each other during operation. Bumps and jars encountered by the vehicle during operation tend only to make the securement of the cab to the frame even more secure since upward movement of cab frame 140 and hence latch pin 242 will only cause the latch pin to seat more firmly in the bight inside keeper 255.

Figure 24:
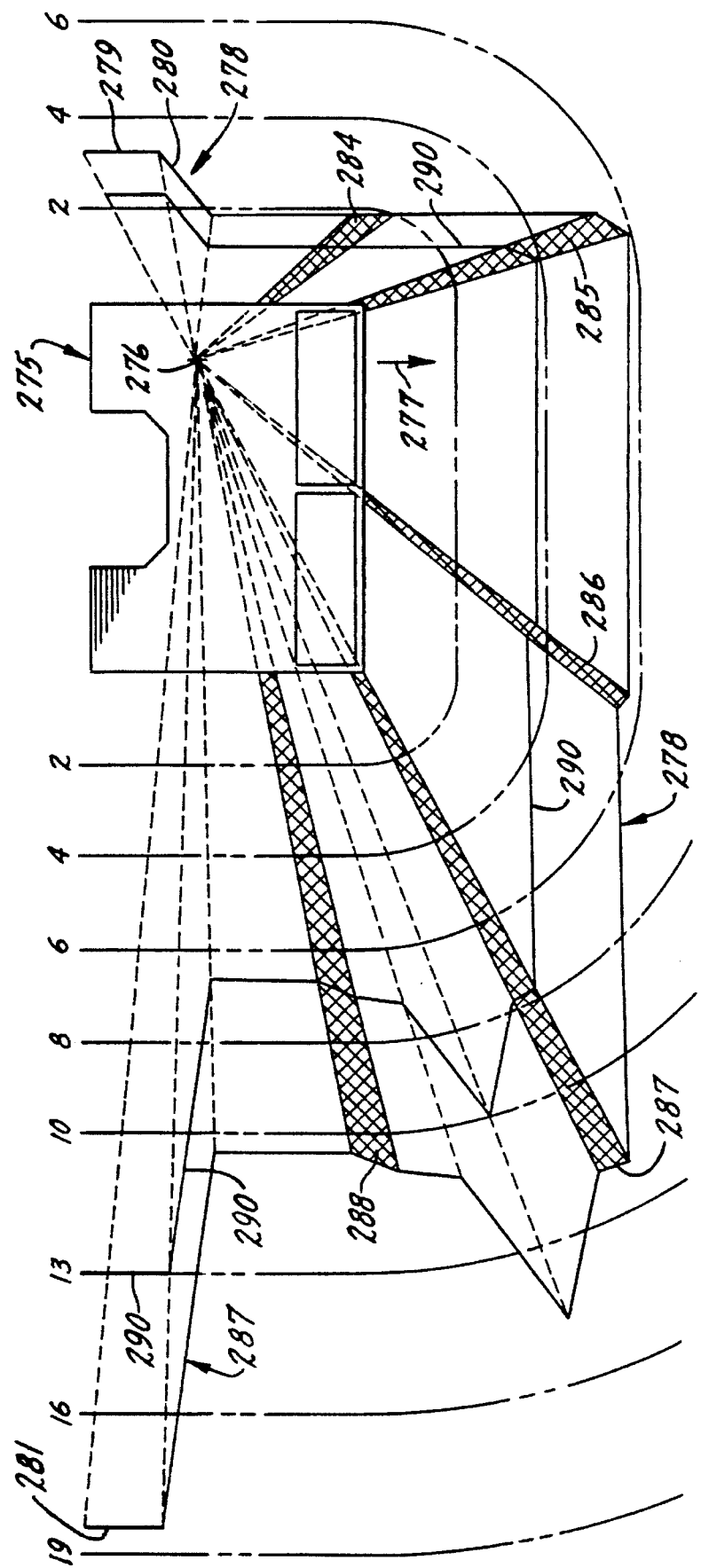
FIG. 24 is a plan view of the field of downward vision as viewed by a driver on the left side at an eyeball height of 5'6" above the floor of the cab and showing vision impairment.

The limits of downward vision of an operator in the left driver's position whose eyeball is 5'6" above the cab floor is shown in FIG. 24. That is, the Figure illustrates the ground area surrounding the cab that the driver, when placed as described above, cannot see. As will be apparent hereinafter, the hidden field is only a maximum of about 6' at ground level for about ⅔ of the arc viewable by the driver, and over 10' throughout only about 40° or even less of the entire approximately 200° field of vision, which illustrates the excellent downward vision of the present vehicle.

An outline of a cab top panel as defined by the walls, doors and windows is indicated generally at 275. The driver's eyeball, located 5'6" above the cab floor, is indicated at 276. A plurality of ground sight lines, eight in this instance, are indicated at 2, 4, 6, 8, 10, 13, 16 and 19. Each of the eight just recited numbers represents the distance in feet of a ground sight line surrounding the exterior of cab outline 275; the said lines are spaced, in feet, from cab outline 275 that number of feet which is associated with each line; hence, line "2" is spaced 2' from cab outline 275, line "10" is spaced 10' and so on. As will be obvious, the forward line of sight is indicated by arrow 277.

The inner limit of downward ground vision is indicated generally by line 278. Starting at the right edge of the drawing, but actually the left side of the cab when looking in the direction of the arrow 277, the line 278 of downward ground vision has a first component 279, a second component 280, and so on to last component 281. First component 279 is derived from the upper edge 282 of the lower portion of left door 186, see FIG. 14. Second component 280 is derived from the sloped contour 283 of the lower portion of left door 186, and so on around to last component 281. The five shaded areas, 284, 285, 286, 287 and 288, depict vision impairments. Area 284, for example, represents the vision blockage presented by the front vertical edge post 289 of the left door 186. Obviously, the driver, by moving his head slightly about base point 276, can cause the vision impairment areas to be displaced from the position illustrated in FIG. 24 and slight forward or rearward movement of the vehicle, assuming the driver's eyeball remains in the same relative place and space with respect to cab frame 140, will cause displacement of the vision impairment areas from moment to moment. As a result, the cab structure presents effectively 100% viewing of the area outside of downward ground vision line 278. It will also be noted that the driver's view extends more than 180° about a line through reference point 276 perpendicular to the direction of movement 277. Specifically, the downward sweep field of vision is about 200° as depicted, for example, by the additional increments of viewing represented by the first component of the view limit of downward vision 279, the second component 280, and the last component 281.

For reference, a fourth line 290 depicts the intersection of an 18" high vertical plane surrounding the driver's eyeball 276. As seen in the Figure, this height, which may represent, for example, the height of a small child, extends a maximum of 13' from the driver's eyeball, and a great portion of the line of intersection is about 4' or even less. Hence, the driver has a very high margin of sight safety with respect to a toddler or other objects which are located too close to the vehicle.

Figure 25:
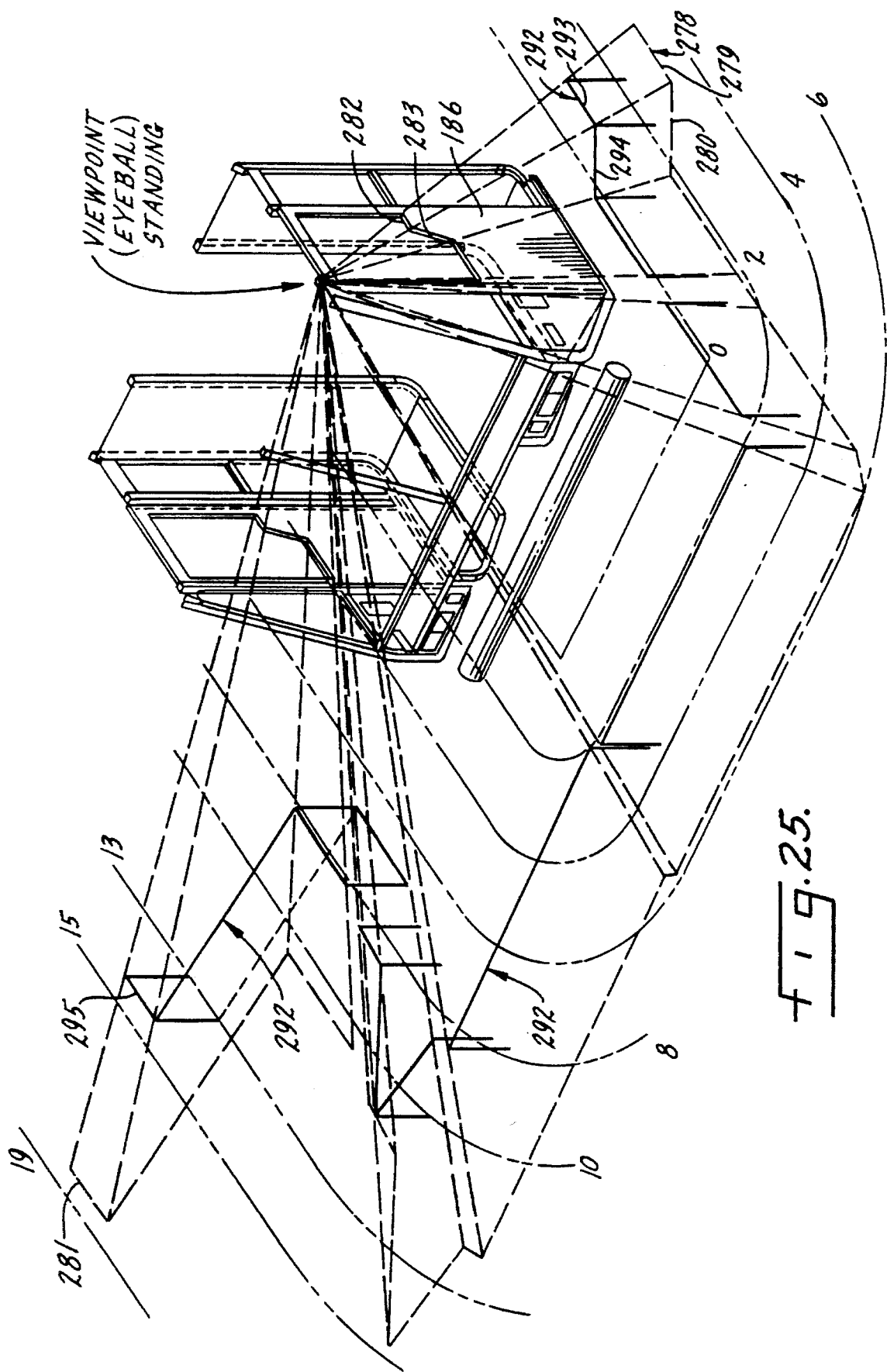
FIG. 25 is a perspective view of the ground level limits of visibility as viewed by the driver on the left side at an eyeball height of 5'6" above the floor of the cab and showing particularly the 12" above ground level visibility limit.

FIG. 25 is a view similar to FIG. 24 which is presented for further clarification of the downward ground vision concept discussed above. The inner limit of downward vision is again indicated at 278 with the first, second and last components thereof indicated at 279, 280 and 281. In this Figure, in addition, an additional line, indicated generally at 292, denotes the limits of visibility through the doors and window 12" above the ground line, said 12" height line having first component 293, second component 294 and last component 295. This height would represent the height, for example, of a baby sitting on the ground. It will be noted that such small objects are easily visible to the driver within 4 ground feet from cab frame 140 and within 10' over about 150° of the sweep angle of vision so that the safety factor is very high for this type of vehicle.

FIGS. 26–29, together with FIGS. 8 and 20, illustrate the unique steering and cab pivot assembly of the vehicle including particularly the dual drive steering system.

Figure 26:
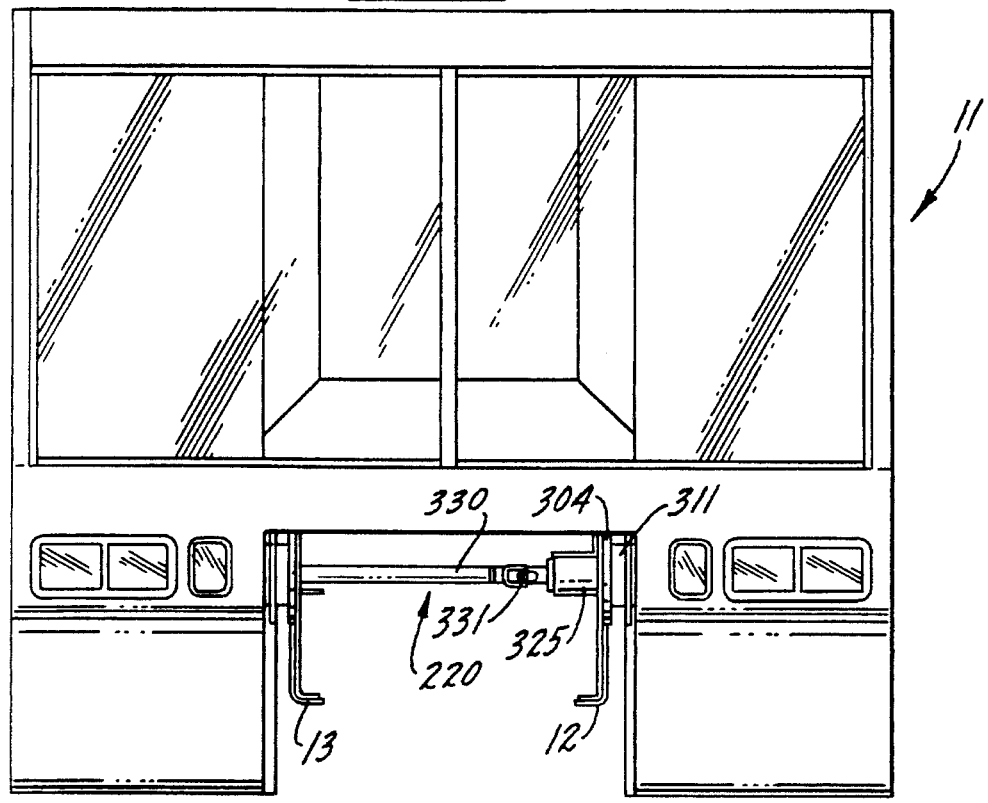
FIG. 26 is a front elevation of the steering and cab pivot assembly with parts omitted for clarity.

The cab pivot assembly is illustrated best in FIGS. 26, 28 and 29, and particularly in FIG. 28. Left frame rail 12 and right frame rail 13 extend forwardly ahead of front axle assembly 14 as illustrated diagrammatically in FIG. 27. A left cab mounting bracket is indicated at 300 secured to left frame rail 12 and a right cab mounting bracket is indicated at 301 secured to right frame rail 13, the two cab mounting brackets forming, in effect, an extension of the frame rails and making possible the separation of the cab, following disassembly of the steering system, from the balance of the chassis.

Left and right chassis attachment members for the pivoting cab are indicated generally at 302, 303, but since the assemblies are identical, one to the other, only left assembly 302 will be described. Left chassis attachment assembly includes a top hat shaped structure consisting of a circular inner race 304 having a central bore 305, shown in right chassis attachment assembly 303 for clarity, which is secured to the left cab mounting bracket 300, and hence the chassis, by a plurality of bolts 306. A sleeve 307 having an outside bearing surface projects outwardly toward the outside of the vehicle from the central bore 305.

An outer race assembly is indicated generally at 309, the outer race assembly including a circular outer race 310, an inwardly projecting sleeve 311, and a circular flange 312 extending radially outwardly from sleeve 311 about ⅓ of the way inward from outer race 310. The flange 312 is secured by bolts 313 to cab mounting plate 314. An isolator, which may, for example, be a circular urethane cushion, is indicated at 315, the isolator functioning as a spacer and a self-lubricated bearing between inner race sleeve 307 and outer race sleeve 311, thereby enabling the outer race, and hence the cab 11, to pivot with respect to the frame rails 13 and 14 of the chassis about cab pivot axis 221 when piston rod 227 of cab tilt cylinder assembly 225 (see FIG. 20) is extended and retracted.

Figure 27:
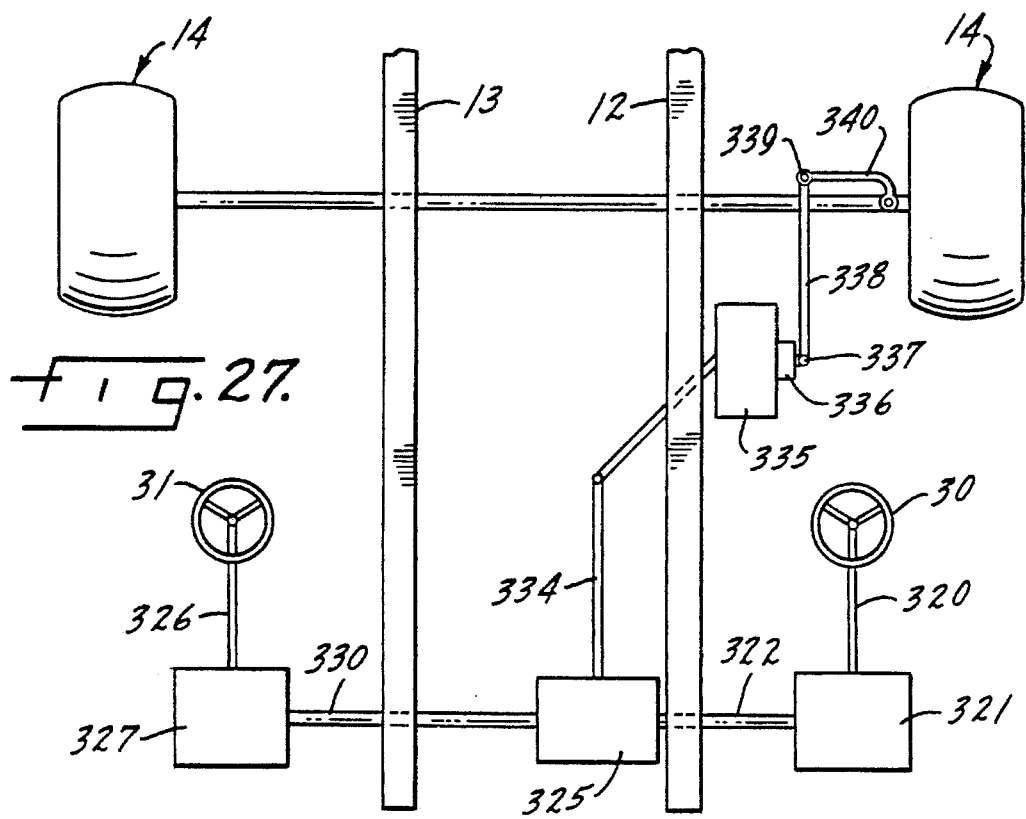
FIG. 27 is a schematic view of the dual drive steering system.

The dual drive steering system is illustrated best in FIGS. 26–28 together with FIGS. 1, 2, 8 and 20 for reference.

Referring first to FIG. 27, the system includes left steering wheel 30 which operates left steering column 320, which terminates in a conventional mitre box 321. The left steering shaft 322 extends from mitre box 321 inwardly to a universal joint, indicated generally at 323 in FIG. 28, an output side 324 of which terminates at a "T"-gear box 325. Right steering wheel 31 operates left steering column 326 which terminates in a conventional mitre box 327. Right steering shaft 328 extends from right mitre box 327 inwardly to a universal joint indicated generally at 329 in FIG. 28. An extension shaft which extends from the output side of universal joint 329 is indicated at 330, the inner end of the extension shaft terminating at universal joint 331. The output side 332 of universal joint 331 forms the right input side of T-gear box 325. T-gear box 325 is mounted to the chassis by gear box mounting bracket 333. It will be understood that the T-gear box 325 links the lefthand steer 30 and the righthand steer 31 to a longitudinal shaft connected to the steering gear.

Referring now particularly to FIG. 27, it will be seen that steering control fed to T-gear box 325 is transmitted by a jointed longitudinal shaft 334 to a steering gear 335 fixed with respect to the chassis. The output side 336 of the steering gear is pivotally linked as at 337 to drag link 338 which in turn is pivotally connected as at 339 to steering arm 340. The steering arm is pivotally connected to the wheel steering linkage, which may be conventional and is thus not further described, for front wheels 14.

It will be noted, particularly from FIG. 28, that ample clearance is provided between the steering system components and sleeves 307 of the inner race 304 so that the cab tilting system and the steering system function independently of one another and without interference during normal operation.

In operation, the vehicle will make numerous repetitive stops as it proceeds along its pick-up route. Since the vehicle is quite heavy as compared, for example, to a pick-up truck, the constant and repetitive application of the brakes can lead to driver fatigue long before the end of a shift. Further, the high frequency application of the braking system can result in an undesirably high rate of wear in the system. Thus, by way of comparison, in present vehicles the driver applies his foot to the brake pedal for each stop. Sometimes the driver applies a gentle pressure but, particularly toward the end of a shift when fatigue sets in, the brakes may be applied sharply which results in a high rate of wear on the brake linings. Alternatively, and sometimes simultaneously, the driver will apply the parking brake. Numerous applications of the parking brake during the course of a shift heat up the associated axle and hence if the vehicle must go down a hill there may be very little braking power left in the parking brake system which is usually thought of as a supplemental safety system.

Another fatigue factor is associated with shifting. In current vehicles, the driver must not only manually brake for each stop but he must also shift to neutral at each stop while the pick-up is being made.

As a result, operation is not smooth over the course of a shift since braking and shifting are entirely dependent on the manual skill of an operator, and operator fatigue due to constant braking and shifting can be a serious problem, particularly near the end of a shift, thus creating operating inefficiencies and safety concerns.

FIG. 30 illustrates an automatic braking and shifting system which maintains operation at peak efficiency, eliminates operator fatigue due to constant braking and shifting, and increases the safety of the pick-up process. Specifically, the operator, with a single lift of a button with his finger or hand, can apply the brakes automatically and shift into neutral at the same time so that the vehicle comes to a gradual stop in a braked condition and with the transmission in neutral. The operator need only learn the natural operating parameters of the vehicle to ensure that the vehicle operates in a virtually automatic manner; that is, the driver need only have a feel for about the distance required to bring the vehicle to a stop and then activate the system by a simple hand movement. Thus all he need do is keep his hand on the steering wheel until the vehicle stops.

Referring now specifically to FIG. 30, air brake chambers, one for each wheel, are indicated at 342, 343, 344, 345, 346 and 347. The brakes are connected to a common air line 348 and hence all brake chambers are subject to the same chamber pressure. A source of pressurized air for the air brake chambers is indicated at 349, a first air line at 350, a pressure reducing valve or regulator at 351, a second air line at 352, automatic brake solenoid at 353, a third air line at 354 and two pressure switchs at 355 and 355a. The engine transmission is indicated generally at 356. An electronic control unit is indicated at 358 for controlling transmission operation as will appear hereinafter. The electrical system includes a source of electricity 359, lines 360 and 360a which extend to palm button 361, and line 362 which connects to automatic brake solenoid valve 353. Control unit line 364 provides power to the electronic control unit 358. A transmission line is indicated at 365 and a neutral sensing line at 366, the line 366 connecting transmission 356 to the electronic control unit 358. Line 370 is a signal line which sends a signal from the pressure switch 355, which senses the pressure in the air brake system, to the electronic control unit 358. Line 365 is a signal line which sends a signal from pressure switch 355 to transmission 356.

In operation, as the vehicle nears a spot on its path where the operator desires to stop the vehicle, the operator prepares to actuate the system. Based on experience, and knowing the operating conditions including speed and load, the operator soon develops the skill of knowing when to actuate the system. When the actuation moment arrives, the operator lifts the palm button 361 with his finger and the system of FIG. 30 then controls the braking and shifting function to bring the vehicle to a full stop at the required pick-up spot. Closure of the palm button energizes the electronic control unit via line 364, and de-energizes solenoid 353 causing air to flow to the brake chambers and apply the brakes. At the same time, line 370 transmits a signal which reflects the pressure in the air brake system to the control unit 358 and line 365 transmits a signal which reflects pressure in the air brake system to the transmission 356. When the pressure switches sense pressure in the brake system, a signal is sent through line 370 to ECU 358, telling the ECU that the brakes have been applied. A signal is also sent through line 365 to transmission 356, telling the transmission to disengage.

A de-engerizing valve is used to apply the brakes. This is used out of concern for safety. If power should be lost to solenoid valve 353, the brakes will apply bringing the vehicle to a safe stop.

Figure 31:
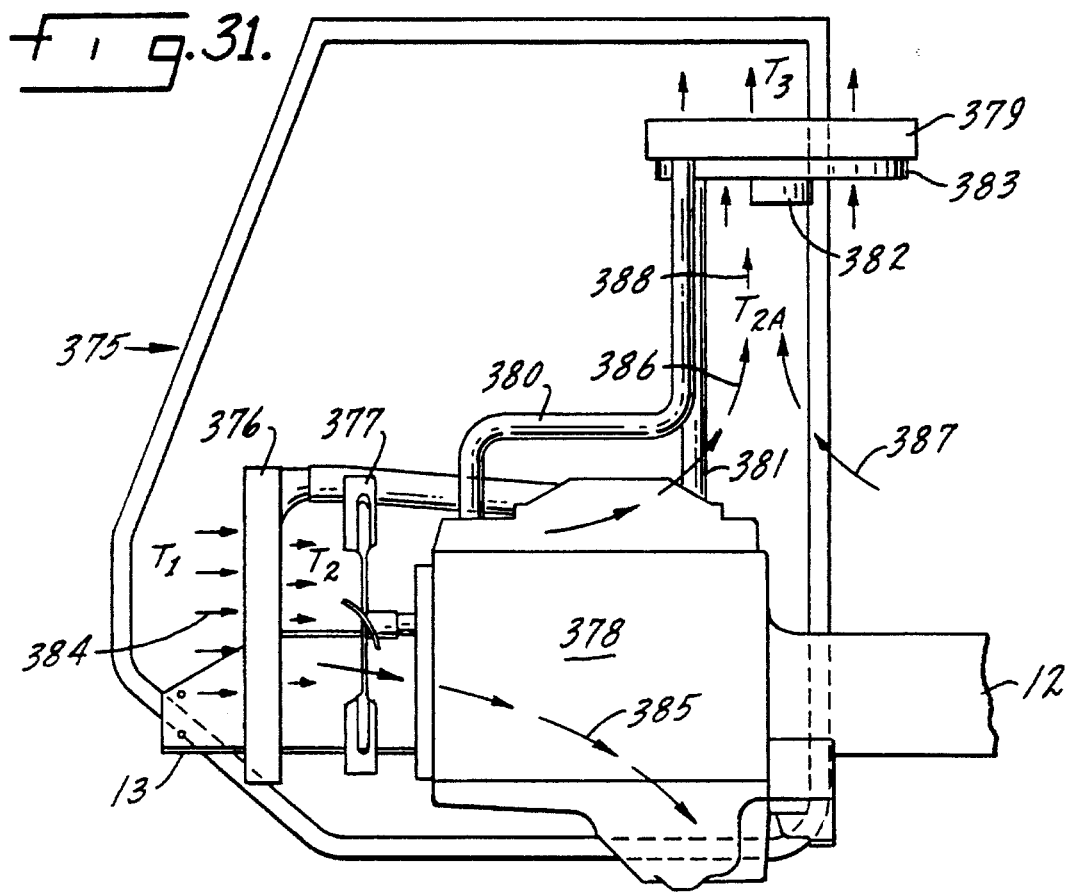
FIG. 31 is a partly schematic view of the unique cooling system.

The unique cooling system of the present invention is illustrated in FIG. 31.

It will be understood that with respect to engines of the size appropriate to the type of vehicle herein disclosed, that is, for example, engines of about 250 hp, turbocharging and aftercooling is required in order to meet EPA emission standards. The conventional mode of accommodating the aftercooling requirement is to place the charged air cooler and the radiator in sequence and develop the required air volume with a single fan. In such a conventional system, the temperature of the air entering the charged air cooler, $T_1$, may be on the order of 70° F., the temperature of the air leaving the charged air cooler and entering the radiator, $T_2$, may be about 100° F., and the temperature of the air leaving the radiator, $T_3$, may be about 125° F. Such a system does however have certain disadvantages which are inherent in the above-described arrangement of components with consequent adverse impact on the system as a whole. Specifically, from an ergonometric standpoint, the size of the vehicle cab is determined by the size of the radiator, not the size of the engine. Thus, since the temperature of the air entering the radiator is relatively high; i.e.: about 100° F., a large volume of air must pass through the radiator in order to provide the desired cooling effect if the temperature of the discharged air, $T_3$, must be about 125° F. which is about the highest acceptable temperature considering all applicable factors. Providing such a volume does however require a large fan; indeed, a fan capacity very significantly larger than is required by the charged air cooler itself. As a result, the radiator fan requires a large volume which in turn dictates a large cab structure, a high cost is associated with the radiator and its associated fan due to the air volume demands of the system, and a high operating cost is experienced due to the relatively high horsepower requirements of the large capacity fan. If space design considerations limit the available cab volume, the end result is to reduce operator space due to the cooling system space requirements which is an ergonometrically undesirable result.

The cooling system of the present invention beneficially addresses all of the above-described disadvantages of current conventional systems in an efficient and economical manner. Specifically, the volume requirement of the cooling system components is decreased as contrasted to the volume requirement of conventional systems so that the ergonometrics of the cab are improved, original equipment cost is lower, and, since less horsepower is required as contrasted to current systems, the new system is less costly to operate.

Referring now to FIG. 31, the cross section of the cab is indicated generally at 375. A charged air cooler is indicated at 376, an associated fan at 377, and the vehicle engine at 378. The radiator for the engine is indicated at 379 and inlet and outlet lines for passage of the engine coolant are indicated at 380, 381. A fan motor for the radiator is shown at 382 and a shroud 383 surrounds the fan, not shown, driven by the fan motor 382.

The direction of the air entering the charged air cooler is indicated by arrow 384 and the temperature of the air entering the charged air cooler is indicated at $T_1$. Said temperature may, for example, be assumed to be $T_1$ at about 70° F.

The temperature of the air leaving the charged air cooler is indicated at $T_2$ and it may be assumed that $T_2$ is about 100° F.

After passing through the fan 377, the air stream is split into two sub-streams. The first sub-stream, indicated at 385, is discharged to atmosphere. The second sub-stream, indicated at 386, is directed toward the radiator fan. A make-up stream of air, indicated at 387, mixes with sub-stream 386 to form an air stream 388 which enters the radiator 379. The temperature $T_{2A}$ of the entering air stream may be on the order of about 85° F., this temperature being derived from the blending of the 100° F. air leaving the charged air cooler, $T_2$, and atmospheric air 387, at about 70° F.

The temperature of the air leaving radiator 379, $T_3$, may be on the order of about 120° F. As a consequence, a cooling range of about 35° F. around the radiator is provided in the system shown in FIG. 31 as contrasted to a cooling range of about 25° F. in a conventional system. It will also be understood that the greater range of the illustrated system is achieved with a lower discharge temperature—which thereby enables the engine to run cooler.

Although two fans are utilized in the illustrated system as contrasted to a single fan in conventional systems, the two fans of the illustrated system are currently lower in original cost than the single fan of a conventional system and, also, are lower in total horsepower requirement to operate so that the operating costs are lower. In this connection, it should be particularly noted that there are times when both the charged air cooler and the cooling system need not be simultaneously operating. In a conventional system, however, and since the two systems are dependent on operation of a single cooling fan, both the charged air cooler and the cooling system must operate at all times. In the illustrated system, since separate fans are provided for the charged air cooler and the cooling system, both systems need not always operate simultaneously.

Figure 32:
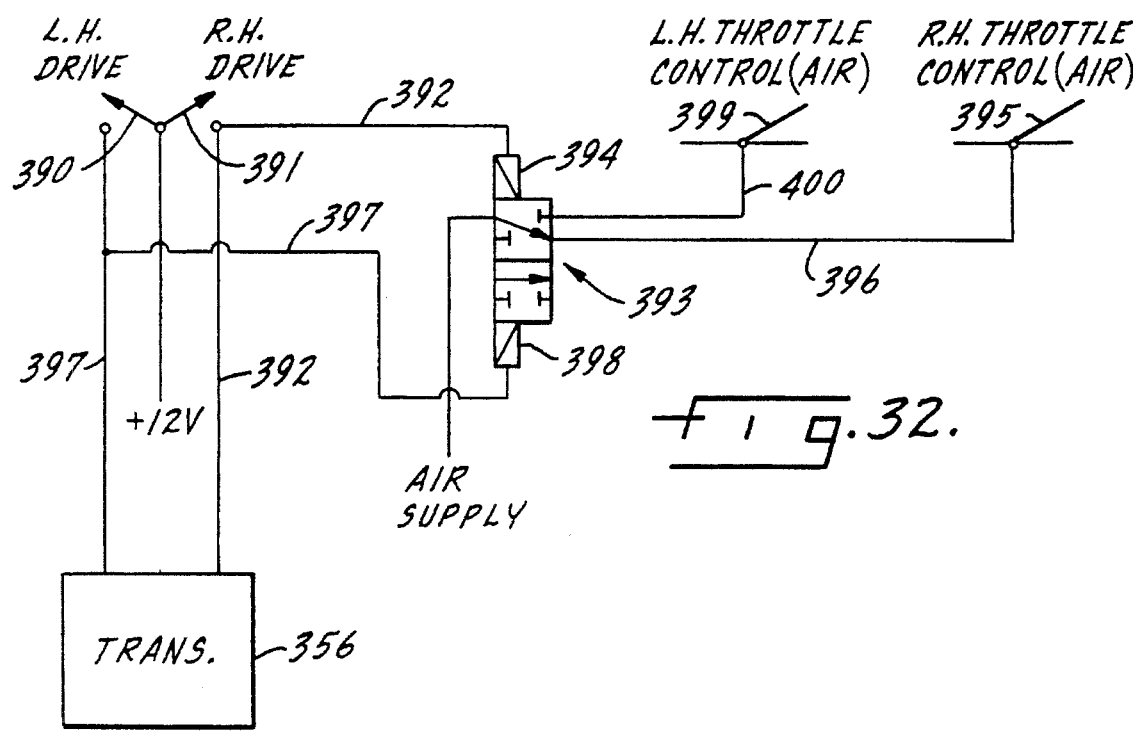
FIG. 32 is a schematic illustration of left side and right side driving.

An unusual safety feature in a refuse vehicle is illustrated in FIG. 32 which shows a variable shift pattern as a function of driving position.

As the vehicle traverses its route on the right side of the street, it is more convenient for the operator to steer from the righthand side of the cab since this steering position minimizes the distance the driver must walk between the steering seat and the pick-up point on the curb or roadside. Since the vehicle movement is stop and go from pick-up point to pick-up point, as contrasted to a continuous run from the last pick-up point to the refuse dump, and back, there is no need for high speed and, indeed, the attainment of high speeds during pick-up are disadvantageous from the standpoint of operator fatigue and operating costs, particularly brake wear. However, in conventional mechanical transmissions which are disposed with left and right side driving positions, once the transmission is shifted into gear all gears are available. Not only are the higher gears not needed but the fact that they are available poses a safety threat in that, as a result of improper shifting by a careless or fatigued driver, the vehicle can be unexpectedly and undesirably shifted into a higher gear with disastrous consequences during curb-side pick-up.

FIG. 32 illustrates a shifting control system whereby only lower gears, for example, gears 1, 2 and 3, are available during righthand driving; i.e.: curb-side driving and the full range of gears, for example, gears 1, 2, 3, 4 and 5, are only available during lefthand driving; i.e.: during day end and continuous run driving. Thus the maximum speed attainable with righthand driving may be about 30 mph which is adequate for the great bulk of righthand drive operation while the maximum speed attainable with lefthand may be about 60 mph—which would be a dangerous speed if available, by accident, with righthand driving.

Transmission 356 is an electronic transmission which may have, for example, a total of five gear ratios. However, the number of gears available depends upon whether the lefthand drive switch 390 or the righthand drive switch 391 is actuated. If, for example, the operator selects righthand drive by moving switch 391 clockwise, line 392, which controls the lowest three gears only in transmission 356, is energized which causes a two-position valve, indicated generally at 393, to move to the illustrated position upon operation of solenoid 394, and the Air Supply is connected to the righthand throttle control 395 via air line 396. The operator then controls the stop-and-go movement of the vehicle via the throttle but there is no direct mechanical linkage between the throttle and the transmission; rather, the throttle movement generates a proportional pneumatic and then electronic signal which is transmitted to the available gears, here, only three, in the electronic system. In similar fashion, when the operator selects lefthand drive by moving lefthand drive switch 390 in a counterclockwise direction, line 397, which controls all five gears in transmission 356, is energized which in turn actuates solenoid 398 to move the two-position valve 393 to a position in which the air supply is connected to lefthand throttle control 399 via lefthand throttle control air line 400.

Although a specific embodiment has been illustrated and described, it will at once be apparent those skilled in the art that modifications may be made within the spirit of the invention. Accordingly it is intended that the scope of the invention be limited not by the foregoing description but solely by the scope of the hereafter appended claims when interpreted in light of the relevant prior art.

We claim:

1. In combination in a refuse/recycler vehicle, an integrated chassis vehicle, including, firstly, a main chassis having front wheel means and rear wheel means including a rear drive axle, at least one recycling bin having enclosing walls and a floor on the main chassis for recyclable materials, means for curbside loading of the recyclable materials to the recycling bin, means for unloading the recycling bin, and secondly, a tag axle chassis (having wheel means, said wheel means including a tax axle,)

said tag axle chassis being rigidly secured to the main chassis to form (an) a rigid integrated chassis, said tag axle chassis having wheel means continuously in contact with the ground, said wheel means including a tag axle, said tag axle chassis wheel means being located generally rearwardly of the rear wheel means of the main chassis and being effective to assume load as the integrated chassis moves downwardly as the load on the vehicle increases, a refuse body mounted on the tag axle chassis, said refuse body having at least a floor, containment wall means extending upwardly from the floor and discharge means, and motive means mounted on the main chassis for propelling the vehicle and providing power to unload the recycling bin and the refuse body.

2. The refuse/recycler vehicle of claim 1 further characterized in that the refuse body includes means to load from the side and means to discharge from the rear, said refuse body having said at least floor and containment walls.

3. The refuse/recycler vehicle of claim 2 further characterized in that the refuse body is spaced rearwardly of the recycling bin to provide a space therebetween, and further including a refuse receiving trough located in the tag axle chassis rearwardly of the recycling bin and forwardly of the refuse body, said refuse receiving trough extending rearwardly into communication with a lower region inside the refuse body, and a ram assembly movable, by motive means, from a retracted position, in which the trough between the recycling bin and the refuse body is open for the reception of refuse, to an extended position in which refuse which has been placed in the trough is moved into the said lower region of the refuse body.

4. The refuse/recycling vehicle of claim 3 further characterized in that the refuse body extends upwardly from its lower end, the interior thereof being substantially uninterrupted from its lower region to its upper region so that that batch of refuse which is initially placed in the lower region of the refuse body is elevated as each succeeding batch of refuse is loaded into the trough and pushed into the said lower region of the refuse body.

5. The refuse/recycling vehicle of claim 4 further characterized in that the refuse body includes an elevated refuse receiving chamber which is in communication with the upper region of the refuse body and extends forwardly therefrom so that said elevated chamber at least partially overlies the refuse receiving trough.

6. The refuse/recycling vehicle of claim 4 further characterized in that a rear portion of the refuse body being swingable rearwardly and upwardly by pivot mounting means about an elevated horizontal axis whereby refuse in said refuse body may be discharged therefrom by gravity and by movement of the ram assembly into the refuse body.

7. The refuse/recycling vehicle of claim 1 further characterized in that the means for unloading the recycling bin includes means for tilt-emptying the recycling bin.

8. The refuse/recycling vehicle of claim 7 further characterized in that the means for tilt-emptying the recycling bin includes means providing roll-off clearance.

9. The refuse/recycling vehicle of claim 8 further characterized in that the means for tilt-emptying the recycling bin with roll-off clearance is an articulated linkage pivotally connected to the main chassis at two locations and to the recycling bin at a third location which is elevated with respect to the aforesaid two locations whereby the bin is lifted and displaced outwardly from the vehicle's center line as it is tilted.

10. The refuse/recycling vehicle of claim 9 further characterized in that the recycling bin has side doors which swing around a horizontal axis at an upper portion of the bin.

11. The refuse/recycling vehicle of claim 9 further characterized in that the linkage elevates and translates the recycling bin to a street side of the vehicle.

* * * * *